US012585036B2

(12) United States Patent
Kindt et al.

(10) Patent No.: US 12,585,036 B2
(45) Date of Patent: Mar. 24, 2026

(54) X-RAY SYSTEM, X-RAY DETECTOR, PIXEL CONTROLLER, AND METHOD FOR MULTI-SPECTRUM IMAGING

(71) Applicant: Teledyne Dalsa B.V., Eindhoven (NL)

(72) Inventors: Willem Johannes Kindt, Eindhoven (NL); Alouisius Wilhelmus Marinus Korthout, Eindhoven (NL); Willem Hendrik Maes, Eindhoven (NL)

(73) Assignee: TELEDYNE DALSA B.V., Eindhoven (NL)

( * ) Notice: Subject to any disclaimer, the term of this patent is extended or adjusted under 35 U.S.C. 154(b) by 173 days.

(21) Appl. No.: 18/518,764

(22) Filed: Nov. 24, 2023

(65) Prior Publication Data

US 2025/0172707 A1     May 29, 2025

(51) Int. Cl.
*G01T 1/29* (2006.01)
*G01T 7/00* (2006.01)

(52) U.S. Cl.
CPC .......... *G01T 1/2928* (2013.01); *G01T 1/2992* (2013.01); *G01T 7/005* (2013.01)

(58) Field of Classification Search
CPC ...... G01T 1/2928; G01T 1/2992; G01T 7/005
See application file for complete search history.

(56) References Cited

U.S. PATENT DOCUMENTS

| | | | | |
|---|---|---|---|---|
| 5,887,049 A | * | 3/1999 | Fossum ................. | H04N 23/30 |
| | | | | 348/E3.018 |
| 2016/0363674 A1 | * | 12/2016 | Jacob ..................... | H04N 25/00 |
| 2017/0006236 A1 | * | 1/2017 | French ................... | H04N 25/40 |
| 2017/0115395 A1 | * | 4/2017 | Grauer ................... | G01S 17/89 |
| 2018/0331137 A1 | * | 11/2018 | Jacob ................. | H10F 39/1898 |
| 2021/0298694 A1 | * | 9/2021 | Lehmann ............. | A61B 6/4233 |
| 2025/0146960 A1 | * | 5/2025 | Yun ....................... | G01N 23/207 |
| 2025/0172704 A1 | * | 5/2025 | Jacobs ................... | G01T 1/241 |

* cited by examiner

*Primary Examiner* — Hugh Maupin
(74) *Attorney, Agent, or Firm* — MH2 Technology Law Group, LLP

(57) ABSTRACT

The present disclosure relates to an X-ray system for multi-spectrum imaging. The system comprises an X-ray source configured to be sequentially operable in a plurality of spectral modes in dependence of at least one synchronization signal, the plurality of modes including a first mode, in which the X-ray source is configured to emit first X-rays having a first spectrum, and a second mode, in which the X-ray source is configured to emit second X-rays having a second spectrum different from the first spectrum; and an X-ray detector comprising a pixel controller, a readout unit, and an active pixel including a first storage element and a second storage element. The pixel controller is configured to control the active pixel in dependence of the at least one synchronization signal to record a first signal associated with the first X-rays in the first storage element and record a second signal associated with the second X-rays in the second storage element. The readout unit is configured to read out the recorded first signal during or after the recording of the second signals by the active pixel.

19 Claims, 18 Drawing Sheets

100

100

100

<u>1b</u>

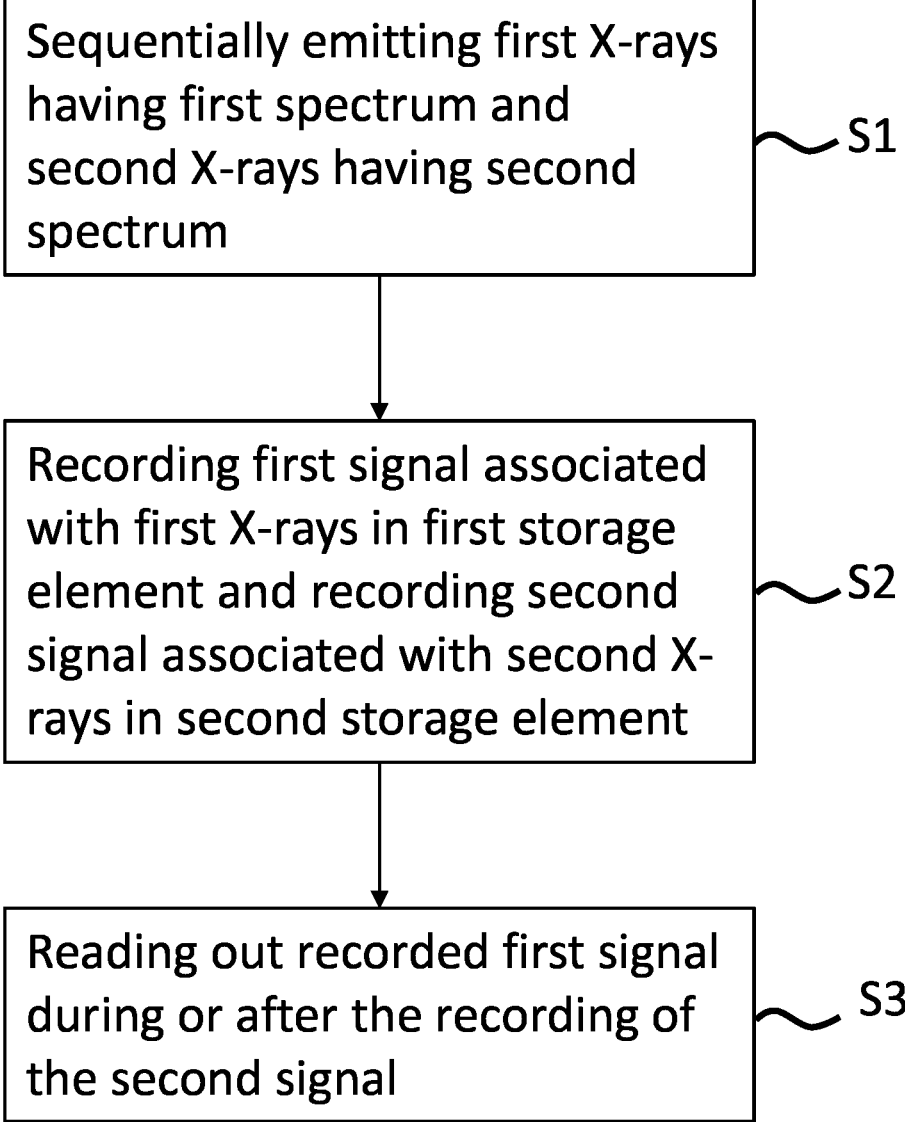

<div style="text-align:center">

Sequentially emitting first X-rays having first spectrum and second X-rays having second spectrum  ～S1

Recording first signal associated with first X-rays in first storage element and recording second signal associated with second X-rays in second storage element  ～S2

Reading out recorded first signal during or after the recording of the second signal  ～S3

</div>

FIG. 9

X-RAY SYSTEM, X-RAY DETECTOR, PIXEL CONTROLLER, AND METHOD FOR MULTI-SPECTRUM IMAGING

FIELD

Aspects of the present disclosure generally relate to an X-ray system for multi-spectrum imaging. Further aspects of the present disclosure relate to an X-ray detector and a pixel controller for an X-ray detector that can be used in such a system. In addition, aspects of the present disclosure relate to a method for multi-spectrum imaging. Aspects of the present disclosure particularly relate to X-ray applications such as mammography, fluoroscopy, surgery and tomography, extra oral dental, intra oral dental, and non-medical non-destructive testing applications like e.g., pipe-line inspection and security.

BACKGROUND

X-ray systems are known in the art. These systems comprise an X-ray source for generating and emitting X-rays, and an X-ray detector for detecting the X-rays. The system may also comprise an image processing unit for generating image data such as an X-ray image based on the detected X-rays.

Typically, the X-rays that are emitted by the X-ray source have a single spectrum that is substantially constant in time. It is known that objects or materials may react differently based on the spectrum of the X-rays. For example, some objects or materials may display a higher absorption for certain X-ray spectra than for other X-ray spectra.

In the prior art, approaches have been described in which X-rays with different spectra are used for X-ray imaging. One of the methods to acquire multi-spectrum image data is to work with a multi-spectrum source. This source can generate two or more different X-ray spectra. For example, one X-ray spectrum can mainly have low-energy X-rays and the other X-ray spectrum can have more high-energy X-ray photons.

In prior art systems with a multi-spectrum source, two or more images are taken to get a multi-spectrum X-ray image. These two or more images are taken in succession. Out of necessity, there will be some time delay between the two images. This is a problem because the object that is being imaged can move in between the times at which the two images are taken, leading to motion artefacts. For instance, motion artefacts may appear when imaging a beating heart, or when imaging the flow of blood with a contrast agent through a system of arteries in a human body.

The smaller the time delay at which the images are taken, the better the quality of the multi-spectrum X-ray image. Novel X-ray sources, e.g., those based on carbon nanotubes, can generate different X-ray spectra in quick succession. However, it remains difficult to read the images from an image sensor very quickly using conventional techniques. For instance, the readout of an X-ray image sensor is typically done row-by-row and the sequential readout takes some time. In many cases, the X-ray detector will be limiting the minimum time delay between which two images can be taken.

SUMMARY

Aspects of the present disclosure relate to an X-system that can generate multi-spectrum image data in which the abovementioned problem does not occur or at least to a lesser extent. Aspects of the present disclosure also relate to a corresponding method of generating multi-spectrum image data, and to an X-ray detector, a pixel controller, and an active pixel.

According to an aspect of the present disclosure, an X-ray system is provided. The X-ray system comprises an X-ray source configured to be sequentially operable in a plurality of spectral modes in dependence of at least one synchronization signal, the plurality of modes including a first mode, in which the X-ray source is configured to emit first X-rays having a first spectrum, and a second mode, in which the X-ray source is configured to emit second X-rays having a second spectrum different from the first spectrum. The X-ray system further comprises an X-ray detector comprising a pixel controller, a readout unit, and an active pixel including a first storage element and a second storage element. The pixel controller is configured to control the active pixel in dependence of the at least one synchronization signal to record a first signal associated with the first X-rays in the first storage element and record a second signal associated with the second X-rays in the second storage element. The readout unit is configured to read out the recorded first signal during or after the recording of the second signal by the active pixel.

By reading out the recorded first signal during or after the recording of the second signal, the time delay between integration of the first X-rays and integration of the second X-rays by the active pixel can be minimized, thereby reducing a motion artefact in multi-spectrum imaging. Moreover, by reading out the recorded first signal during the recording of the second signal, the processing is further parallelized, which may enable faster imaging of a plurality of frames.

The active pixel may comprise a photodetector, being a pinned photodiode, 'PPD', configured to convert incident photons into charge, and a transfer element coupled between the PPD and the second storage element. The first storage element may include a capacitor, and the second storage element may be at least partially formed by the PPD.

The second storage element may be configured to temporarily hold a first charge associated with the first X-rays. Furthermore, the pixel controller may be configured to control the active pixel to record the first signal in the first storage element by transferring the first charge from the second storage element to the first storage element using the transfer element.

After transferring the first charge from the PPD to the first storage element, the second storage element may be configured to record the second signal by holding a second charge corresponding to the second signal associated with second X-rays.

While the active pixel is recording the second signal in the second storage element, the readout unit may be configured to read out the recorded first signal from the first storage element. Furthermore, after the readout unit has read out the recorded first signal, the pixel controller may be configured to control the active pixel to reset the first storage element.

After the active pixel has recorded the second signal in the second storage element, the pixel controller may be configured to control the transfer element to transfer the second charge from the second storage element to the first storage element. In that case, the readout unit may be configured to read out the recorded second signal from the first storage element, and, after the readout unit has read out the recorded second signal, the pixel controller may be configured to control the active pixel to reset the first storage element.

Alternatively, after the active pixel has recorded the second signal in the second storage element, the readout unit may be configured to read out the recorded first signal from the first storage element, the pixel controller may be configured to subsequently control the active pixel to reset the first storage element and transfer the second charge from the second storage element to the first storage element using the transfer element, and the readout unit may be configured to subsequently read out the recorded second signal from the first storage element.

The readout unit may be configured to read out the recorded first signal and/or the recorded second signal using correlated double sampling (CDS) or differential double sampling (DDS).

The readout unit may be configured to use a same reference sample of the CDS or DDS for both the recorded first signal and the recorded second signal.

The active pixel may further comprise a source follower and a row selection switch coupled between the first storage element and a column line of the X-ray detector. The pixel controller may be configured to activate the row selection switch to allow the readout unit to read out a signal from the first storage element.

The active pixel may comprise a floating diffusion, 'FD', region to which the first storage element is coupled. Furthermore, the transfer element may be coupled between the PPD and the FD region, or the FD region may form part of the transfer element.

The PPD may comprise a further FD region. In a preferred embodiment, the transfer element may be realized as a metal-oxide-semiconductor, 'MOS', transistor, the FD region and the further FD region corresponding to a drain and a source of the MOS transistor, respectively.

The active pixel may comprise a first reset switch for resetting the first storage element and/or a second reset switch for resetting the second storage element.

The readout unit may comprise an analog-to-digital converter, 'ADC', to convert the recorded first signal and the recorded second signal into digital signals as at least part of reading out the recorded first signal and recorded second signal.

The X-ray detector may comprise a plurality of said active pixels, preferably arranged in a matrix of rows and columns.

The pixel controller may be configured to control the readout unit in dependence of the at least one synchronization signal.

The at least one synchronization signal may include one or more signals indicative of at least one of a start of operating in the first mode by the X-ray source, a termination of operating in the first mode by the X-ray source, a start of operating in the second mode by the X-ray source, a termination of operating in the second mode by the X-ray source, a completion of recording the first signals by the active pixel, a completion of recording the second signals by the active pixel, a completion of reading out the first signals by the readout unit, and a completion of reading out the second signals by the readout unit.

The X-ray detector, preferably the pixel controller, may be configured to generate at least one of the at least one synchronization signal. Additionally or alternatively, the X-ray source may be configured to generate at least one of the at least one synchronization signal. Additionally or alternatively, the X-ray system may further comprise a controller configured to generate at least one of the at least one synchronization signal for the X-ray source and/or the X-ray detector.

The readout unit may be configured to read out the recorded second signal during the recording of another first signal associated with the first X-rays of a subsequent frame among a plurality of frames to be recorded by the X-ray detector.

The X-ray detector may be configured to alternatingly record a signal in one of the first and second storage element while reading out a previously recorded signal from another of the first and second storage element.

The X-ray detector or the X-ray system may further comprise an image processing unit configured to generate spectral images corresponding to the first spectrum and the second spectrum based on data read out by the readout unit.

According to another aspect of the present disclosure, an X-ray detector configured as the X-ray detector as defined in any of the above embodiments is provided.

According to another aspect of the present disclosure, an active pixel configured as the active pixel as defined in any of the above embodiments is provided.

According to another aspect of the present disclosure, a pixel controller configured as the pixel controller as defined in any of the above embodiments is provided.

According to another aspect of the present disclosure, a method for multi-spectrum X-ray imaging is provided. The method comprises: sequentially emitting, by an X-ray source, first X-rays having a first spectrum and second X-rays having a second spectrum different from the first spectrum; recording, by an active pixel of an X-ray detector, a first signal associated with the first X-rays in a first storage element of the active pixel, and a second signal associated with the second X-rays in a second storage element of the active pixel; and reading out, by a readout unit of the X-ray detector, the recorded first signal during or after the recording of the second signal by the active pixel.

Further aspects and/or embodiments of the present disclosure may become apparent from the detailed description presented below.

BRIEF DESCRIPTION OF THE DRAWINGS

Next, the present disclosure will be described in more detail with reference to the appended drawings, wherein:

FIG. 9 is a flowchart of a method for multi-spectrum X-ray readout according to an embodiment of the present disclosure.

Figure 1A:
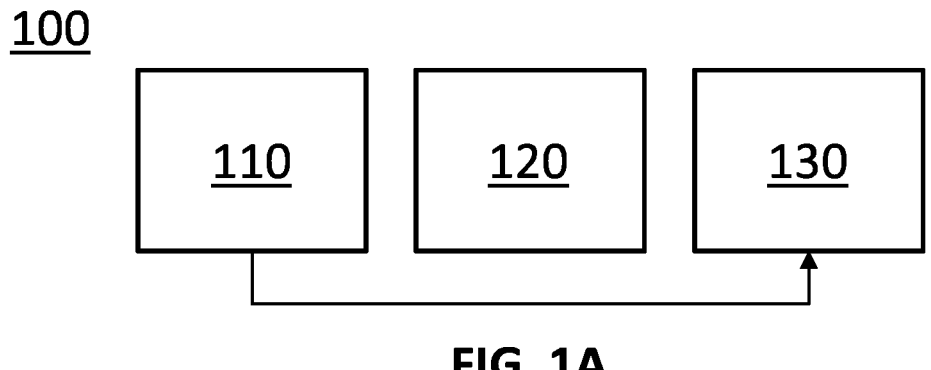
FIG. 1A-1C are schematic diagrams of an X-ray system according to various embodiments of the present disclosure.

In the appended drawings, identical or similar components and/or features may have been assigned the same reference sign for convenience of explanation. Moreover, if a first component is described with reference to an earlier drawing and a second component in another drawing is assigned the same reference sign, the description of said first component with reference to the earlier drawing may identically or similarly apply to the second component with reference to the other drawing, unless explicitly stated otherwise. For reasons of conciseness, the description for the first component may be omitted for the second component with reference to the other drawing.

DETAILED DESCRIPTION

Unless the context clearly requires otherwise, throughout the description and the claims, the words "comprise", "comprising" and the like are to be construed in an inclusive sense, as opposed to an exclusive or exhaustive sense; that is to say, in the sense of "including, but not limited to". As used herein, the terms "connected", "coupled" or any variant thereof means any connection or coupling, either direct or indirect, between two or more elements; the coupling or connection between the elements can be physical, logical, electromagnetic, or a combination thereof. Additionally, the words "herein", "above", "below" and words of similar import, when used in this application, refer to this application as a whole and not to any particular portions of this application. Where the context permits, words in the detailed description using the singular or plural number may also include the plural or singular number respectively. The word "or" in reference to a list of two or more items, covers all of the following interpretations of the word: any of the items in the list, all of the items in the list, and any combination of the items in the list.

The teachings of the technology provided herein can be applied to other systems, not necessarily the system described below. The elements and acts of the various examples described below can be combined to provide further implementations of the technology. Some alternative implementations of the technology may include not only additional elements to those implementations noted below, but also may include fewer elements.

These and other changes can be made to the technology in light of the following detailed description. While the description describes certain examples of the technology, and describes the best mode contemplated, no matter how detailed the description appears, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the appended claims should not be construed to limit the technology to the specific examples disclosed in the specification, unless the detailed description section explicitly defines such terms. Accordingly, the actual scope of the technology encompasses not only the disclosed examples, but also all equivalent ways of practicing or implementing the technology under the appended claims.

Figure 1B:
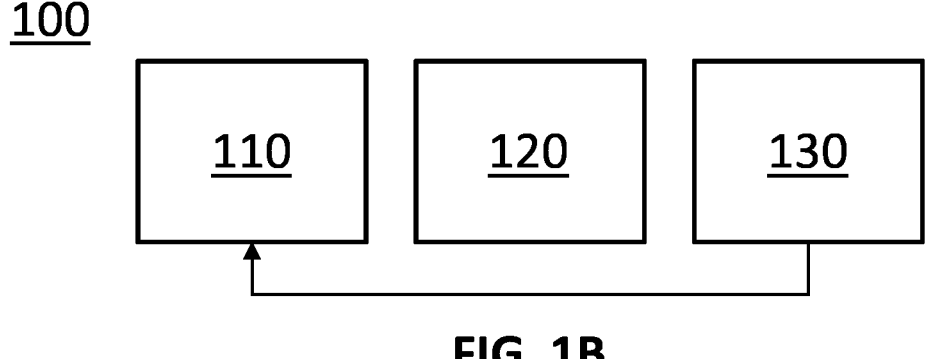
Figure 1C:
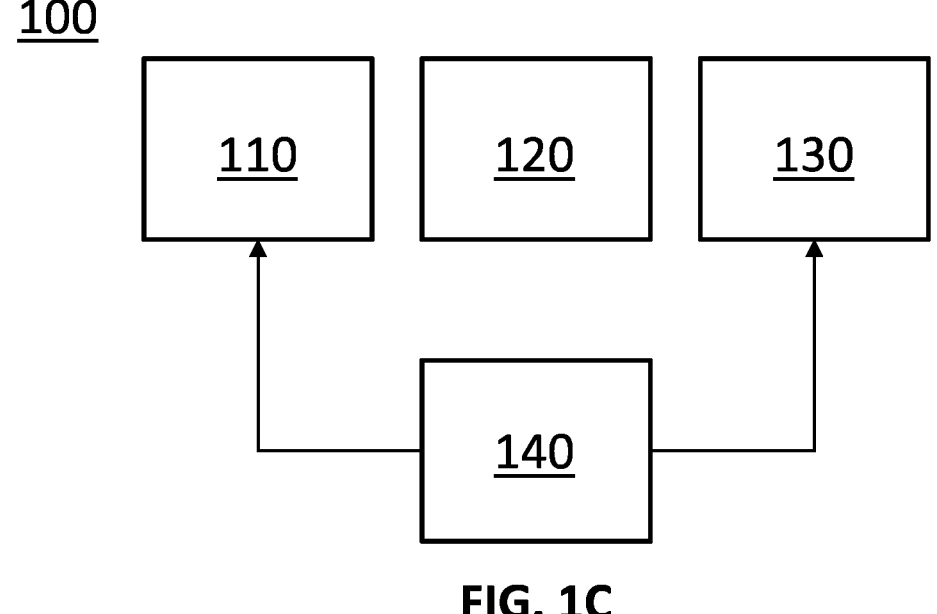

FIG. 1A-1C illustrate an X-ray system 100 according to various embodiments of the present disclosure. X-ray system 100 includes an X-ray source 110 and an X-ray detector 130. X-rays from X-ray source 110 may pass through a target object 120, such as a portion of a human body to be imaged, and may be received at X-ray detector 130 and processed.

X-ray source 110 is configured to be sequentially operable in a plurality of spectral modes, each mode representing a configuration in which X-ray source 110 emits X-rays of a corresponding spectrum. The plurality of spectral modes includes a first mode, in which X-ray source 110 is configured to emit first X-rays having a first spectrum, and a second mode, in which X-ray source 110 is configured to emit second X-rays having a second spectrum. For example, X-ray source 110 may be a configurable X-ray source, or may comprise a plurality of X-ray sub-sources, each configured to emit X-rays having a different X-ray spectrum.

By sequentially emitting X-rays of a plurality of spectra, multi-spectrum imaging can be performed. To that end, X-ray detector 130 is configured to record the first X-rays and the second X-rays. The recorded first and second X-rays are then read out and can be processed into a first and second image corresponding respectively to the first and second X-rays. The X-ray detector will be described in more detail with reference to FIG. 2 below.

For proper functioning of X-ray system 100, X-ray source 110 and X-ray detector 130 should be synchronized. This can be achieved in various ways, using at least one synchronization signal.

As indicated in FIG. 1A using the arrow, X-ray source 110 may be configured to generate at least one synchronization signal and provide it to X-ray detector 130. This for example enables X-ray detector 130 to know when X-rays of a particular spectrum are emitted by X-ray source 110.

As indicated in FIG. 1B, X-ray detector 130 may be configured to generate at least one synchronization signal and provide it to X-ray source 110. This for example enables X-ray detector 130 to indicate that it is ready for a new measurement. The at least one synchronization signal may in that case also function as a control signal to activate X-ray source 110.

As indicated in FIG. 1C, X-ray system 100 may comprise a controller 140 configured to generate at least one synchronization signal for both X-ray source 110 and X-ray detector 130. In this embodiment, X-ray system 100 may be centrally controlled. Controller 140 may for example control X-ray source 110 to emit X-rays of a particular spectrum, and may control X-ray detector 130 accordingly to process said X-rays. In this manner, the timing of X-ray source 110 can be aligned to X-ray detector 130.

Controller 140 may further comprise processing circuitry for centrally processing an output of X-ray detector 130. For example, the multi-spectrum images may be generated by controller 140 instead of X-ray detector 130, though the present disclosure is not limited thereto.

It is noted that the embodiments of X-ray system 100 shown in FIG. 1A-1C may be combined in various ways. For example, rather than unidirectional communication, X-ray source 110, X-ray detector 130 and/or, if present, controller 140 may each be responsible for part of the synchronization between X-ray source 110 and X-ray detector 130, or the control of X-ray source 110 and X-ray detector.

The at least one synchronization signal may represent various types of information, including but not limited to a start of emitting X-rays of a particular spectrum X-ray source, a termination of emitting X-rays of said particular spectrum by X-ray source 110, a start or completion of recording signals associated with X-rays of said particular spectrum by X-ray detector 130, a completion of processing images, an acknowledgement of receipt of a control signal, and the like.

Figure 2:
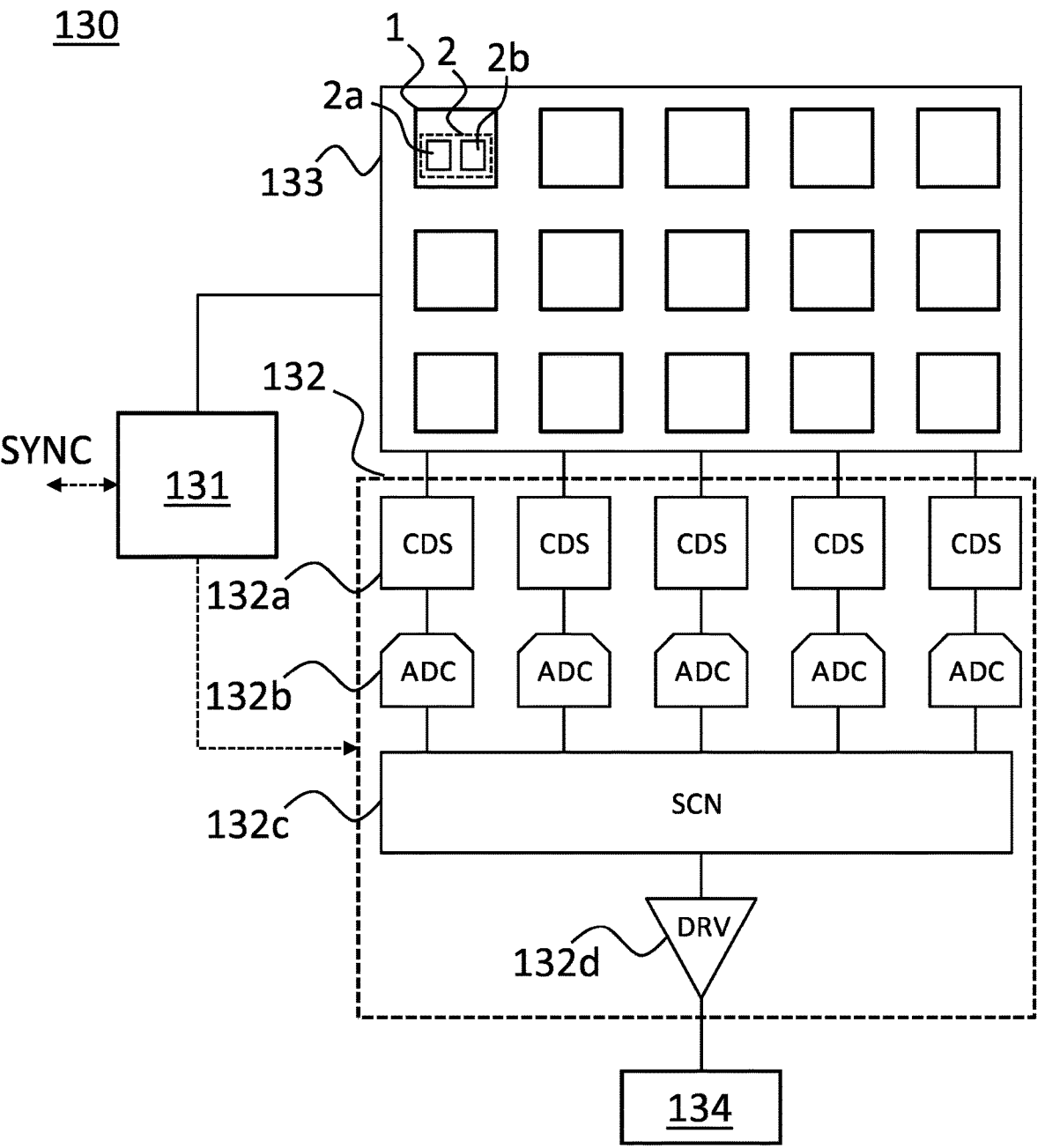
FIG. 2 is a schematic diagram of an X-ray detector according to an embodiment of the present disclosure.

FIG. 2 illustrates an X-ray detector 130 according to an embodiment of the present disclosure. X-ray detector 130 includes a pixel controller 131, a readout unit 132, and a pixel array 133.

Pixel array 133 comprises a plurality of active pixels 1, which may be arranged in an array of matrix and columns. Each active pixel 1 may be identical or similar to one another. For convenience of illustration, only the top left active pixel 1 is indicated in more detail with reference signs. Active pixels 1 are generally configured to convert incident photons into a signal associated with said X-rays. In the case of direct converters, X-rays may be directly incident on a photodetector active pixel 1 and converted directly into a signal. In the case of indirect converters, X-rays may be incident on a scintillator which is configured to convert said X-rays into intermediate photons, e.g., visible light. These intermediate photons can subsequently be incident on a photodetector of active pixel 1 and converted into a signal associated with the intermediate photons and thus indirectly associated with the X-rays. In either case, the signals recorded by active pixels 1 can then be read out by readout unit 132 to be processed further, e.g., into an image reflecting the signals from all active pixels 1 in pixel array 133.

In accordance with the present disclosure, active pixels 1 comprise a storage 2 including a first storage element 2a and a second storage element 2b. The present disclosure is not limited to two storage elements in storage 2. Rather, more than two storage elements may be equally included.

Pixel controller 131 may be configured to control the operation of pixel array 133, in particular each active pixel 1. For example, each active pixel 1 may be coupled to one of a plurality of column lines via a row selection switch (not shown in FIG. 2). The plurality of column lines are coupled to readout unit 132. In that case, pixel controller 131 can control which row of active pixels 1 is coupled to readout unit 132 at a particular time. Of course, instead of column lines, row lines may analogously be used, in which case each pixel may have a column selection switch. Pixel controller 131 may also control the reset of active pixels 1 to enable active pixels 1 to perform a subsequent measurement without being affected by previous measurements. Pixel controller 131 may be further configured to control readout unit 132 synchronously with active pixels 1, and/or readout unit 132 may include a separate controller, and/or may be controlled by an external entity (e.g., controller 140 of FIG. 1C). As shown in FIG. 2, pixel controller 131 may receive and/or transmit one or more synchronization signals SYNC for the purpose of synchronizing the control of pixel array 133 (and/or readout unit 132) with the timing of X-ray source 110.

Readout unit 132 may comprise processing circuitry 132a-132d for processing an output of active pixels 1 of pixel array 133. For example, readout unit 132 comprises a plurality of correlated double sampling (CDS) units 132a, each associated with a respective column line of pixel array 133, a plurality of corresponding analog-to-digital converters (ADC) 132b to convert the analog signal output by CDS units 132a into a digital signal, a scan circuit 132c to sequentially process the digital signals from ADCs 132b, and a driver 132d. An output of driver 132d may be processed by an image processing circuit 134 as shown in FIG. 2 to generate images corresponding to the signals recorded by active pixels 1 of pixel array 133. In an embodiment, image processing circuit 134 forms part of readout unit 132, though the present disclosure is not limited thereto. In fact, image processing circuit 134 may be part of an external entity and need not be part of X-ray detector 130.

Instead of or in addition to CDS units 132a, readout unit 132 may comprise a plurality of differential double sampling (DDS) units associated with each column and/or row, or other types of sampling or readout circuits may be used. Furthermore, readout unit 132 may have one or more separate CDS and DDS units associated with one or more storage elements, such as first storage element 2a and second storage element 2b, of active pixel 1, though this need not be the case if readout is performed sequentially for the one or more storage elements.

Figure 3A:
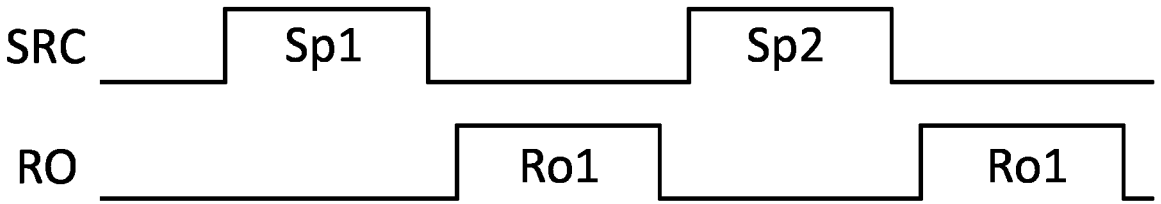
FIG. 3A is a timing diagram for conventional multi-spectrum X-ray readout.
Figure 3B:
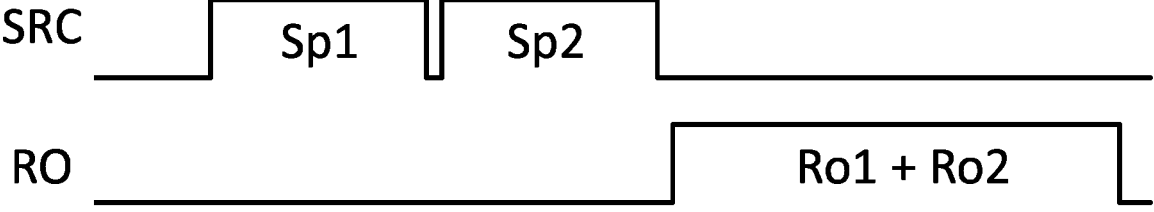
FIGS. 3B and 3C are timing diagrams for multi-spectrum X-ray readout according to various embodiments of the present disclosure.
Figure 3C:
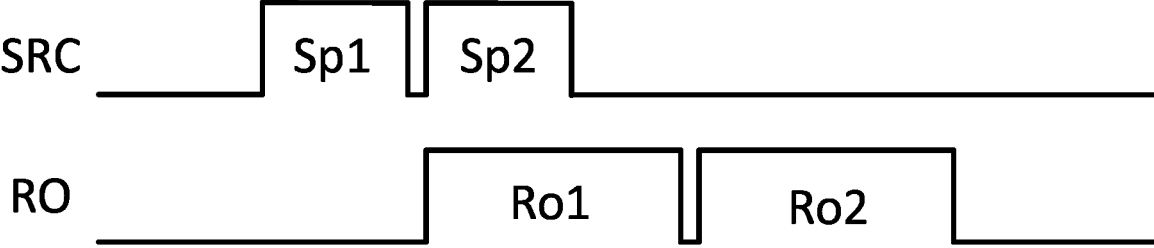

FIG. 3A-3C illustrate various examples of processing X-rays having a first spectrum Sp1 and X-rays having a second spectrum Sp2. Here, SRC refers to X-ray source 110, and RO refers to readout unit 132 of X-ray detector 130.

In a conventional approach, as shown in FIG. 3A, X-ray source 110 emits first X-rays having a first spectrum Sp1, which are received and recorded by X-ray detector 130. After recording first signals associated with the first X-rays of first spectrum Sp1, a first readout Ro1 is performed to process the recorded first signals. After finishing the processing of the recorded first signals, X-ray source 110 emits second X-rays having a second spectrum Sp2, which are received and recorded by the X-ray detector. After recording second signals associated with the second X-rays of second spectrum Sp2, a second readout Ro2 is performed to process the recorded second signals.

First readout Ro1 takes time to complete, thereby causing a time delay between emitting first X-rays of first spectrum Sp1 and second X-rays of second spectrum Sp2. This time delay may result in motion artefacts between recording the first signals and recording the second signals.

In accordance with the present disclosure, in FIG. 3B, first readout Ro1 and second readout Ro2 are performed after recording both the first signals associated with first X-rays of first spectrum Sp1 and second signals associated with second X-rays of second spectrum Sp2. This is rendered possible by active pixels (e.g., active pixel 1 of FIG. 2) comprising a plurality of storage elements, in particular a first storage element (e.g., first storage element 2a of FIG. 2) and a second storage element (e.g., second storage element 2b of FIG. 2). For example, the first signal may be recorded by the active pixel in the first storage element and the second signal may be recorded by the active pixel in the second storage element while holding the first signal in the first storage element. Accordingly, the time delay between first X-rays of first spectrum Sp1 and second X-rays of second spectrum Sp2 can be minimized.

In another example in accordance with the present disclosure, as shown in FIG. 3C, after recording first signals associated with first X-rays of first spectrum Sp1, first readout Ro1 is performed already while recording second X-rays of second spectrum Sp2. Again, this is rendered possible by active pixels including a plurality of storage elements, in particular a first storage element and a second storage element. Accordingly, the time delay between first X-rays of first spectrum Sp1 and second X-rays of second spectrum Sp2 can be minimized.

It is noted that, although FIG. 3C shows first readout Ro1 and second readout Ro2 as taking longer than emitting and recording first spectrum Sp1 and second spectrum Sp2, this is not necessarily the case.

Figure 4A:
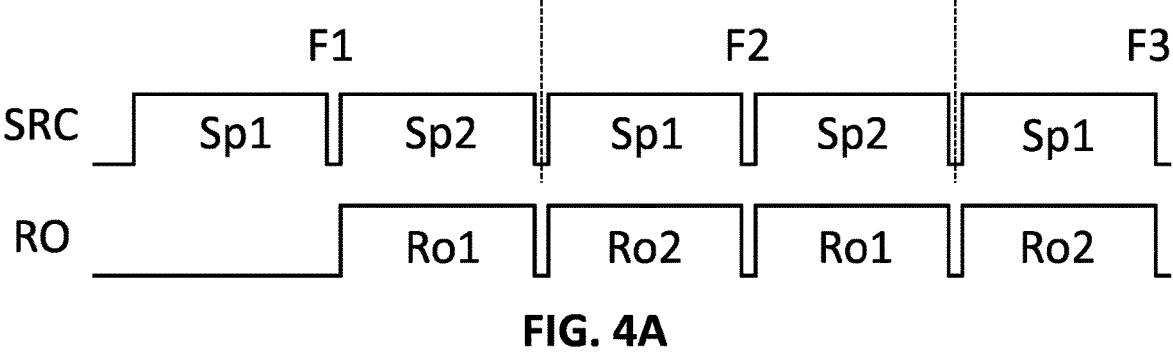
FIG. 4A-4C are timing diagrams for multiple frames of multi-spectrum X-ray readout according to various embodiments of the present disclosure.
Figure 4B:
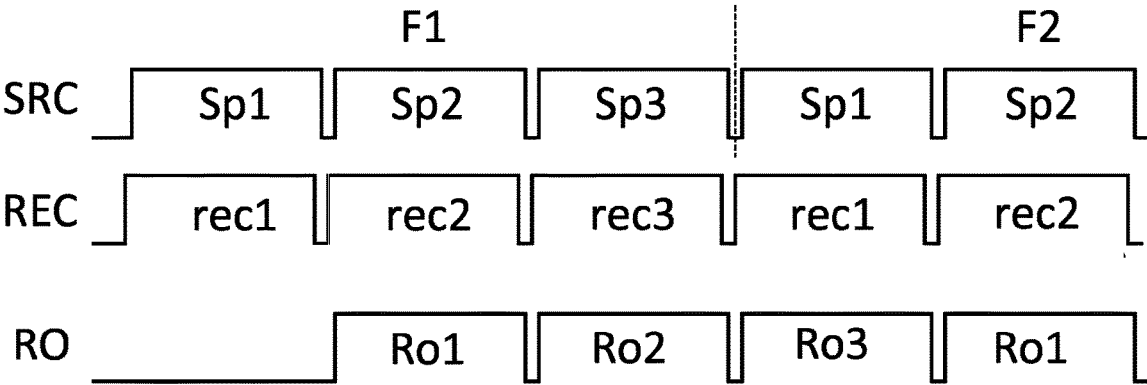
Figure 4C:
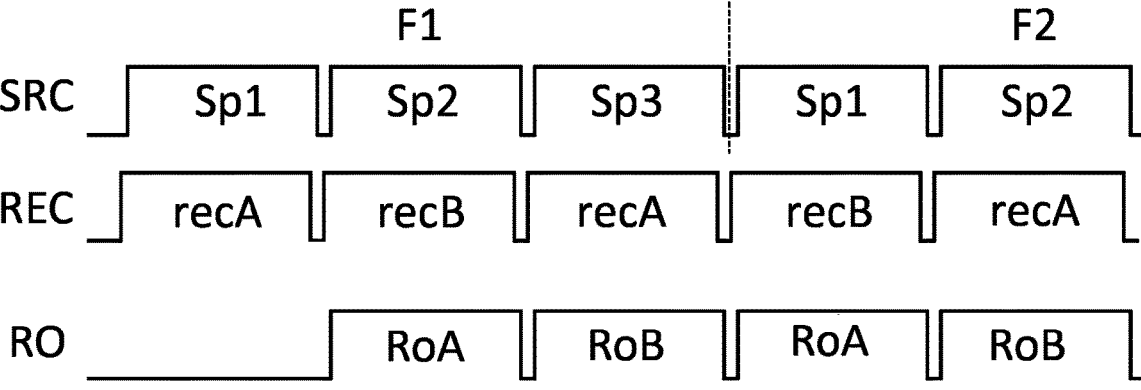

The examples in FIGS. 3B and 3C illustrate the recording of a single frame including multiple spectra. This concept can be extended to sequentially recording a plurality of frames, as shown in FIG. 4A-4C. Here, SRC refers to X-ray source 110, REC refers to active pixel 1 of X-ray detector 130, and RO refers to readout unit 132 of X-ray detector.

In FIG. 4A, X-ray source 110 sequentially emits X-rays for recording a plurality of frames F1-F3, each frame including first X-rays of first spectrum Sp1 and second X-rays of second spectrum Sp2. Based on the concept described with reference to FIG. 3C, first readouts Ro1 may be performed on the recorded first signals while at the same time recording second signals based on second X-rays of second spectrum Sp2. Similarly, second readouts Ro2 may be performed on the recorded second signals while at the same time recording first signals based on first X-rays of first spectrum Sp1. A first pair of first and second readouts Ro1, Ro2 may be used to generate a first image associated with a first frame F1, a second pair of first and second readouts Ro1, Ro2 may be used to generate a second image associated with a second frame F2, and so forth. In this manner, a downtime between emitting X-rays can be minimized even across multiple frames.

In FIG. 4B, X-ray source 110 includes a third spectral mode in which it emits third X-rays having a third spectrum Sp3. In this example, spectra Sp1-Sp3 are included in each of frames F1-F3. To this end, active pixel 1 may include a third storage element in which a third signal associated with the third X-rays can be recorded. The recording of first signals associated with the first X-rays of first spectrum Sp1 is represented as rec1. First readout Ro1 may be performed while recording second signals associated with the second X-rays of second spectrum Sp2, represented as rec2. Second readout Ro2 may be performed while recording third signals associated with the third X-rays of third spectrum Sp3, represented as rec3. As will be appreciated by the skilled person, this concept can be extended to any number of different spectra and corresponding storage elements.

Instead of using a third storage element, the same first and second storage elements may be reused even when more than two different spectra of X-rays are emitted. Reference is made to FIG. 4C, where recA represents recording a signal in first storage element 2a, and recB represents recording a signal in second storage element 2b.

As shown in FIG. 4C, a particular spectrum among spectra Sp1-Sp3 is alternatingly recorded in one of the first and second storage elements 2a, 2b while at the same time reading out the other of the first and second storage elements 2a, 2b. After reading out a particular storage element, it can be reset and prepared for a new recording. In this manner, multi-spectrum readout can be performed efficiently and with minimum time delay between spectra. Moreover, three or more spectra can be recorded and processed without requiring increasing the number of storage elements in storage 2 of active pixel 1. In other words, the imaging illustrated in FIG. 4C can be implemented using only two storage elements, and with those two storage elements any number of sequential spectra can be recorded using the timing illustrated in FIG. 4C.

Figure 5A:
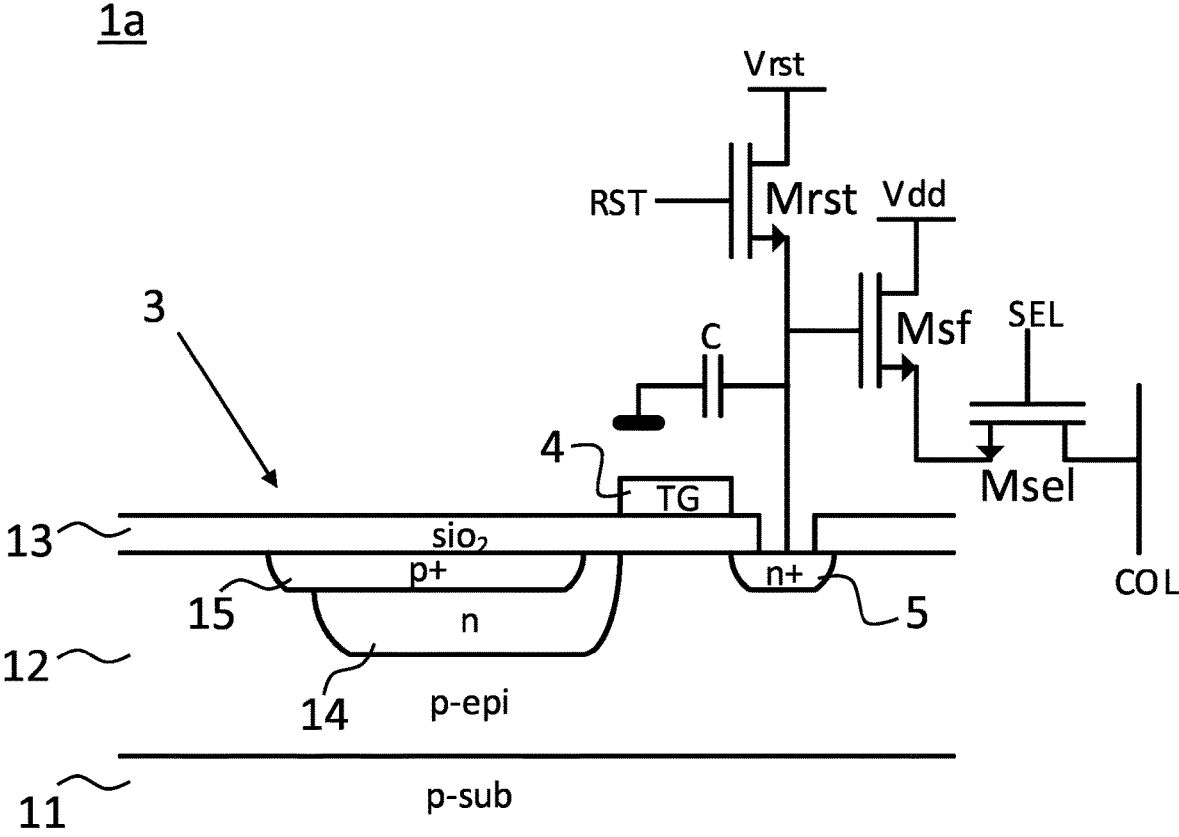
FIGS. 5A and 5B are schematic diagrams of an active pixel according to various embodiments of the present disclosure.

FIG. 5A illustrates an active pixel 1a (e.g., active pixel 1 of FIG. 2) in accordance with an embodiment of the present disclosure. Active pixel 1a includes a photodetector 3, a transfer element 4, a floating diffusion (FD) region 5, a capacitor C, a reset switch Mrst, a source follower Msf, and a row selection transistor Msel. Active pixel 1a may be coupled to a column line COL of a pixel array (e.g., pixel array 133 of FIG. 2). Source follower Msf may be biased using a supply voltage Vdd.

Active pixel 1a as shown in FIG. 5A may typically be used as an indirect converter, i.e., X-ray detector 130 may include a scintillator to convert incident X-rays into intermediate photons, such as visible light, which are subsequently incident on photodetector 3 and converted into a signal associated with said intermediate photons and thus also associated with the incident X-rays.

In this embodiment, photodetector 3 is implemented as a pinned photodiode (PPD), which is realized in a semiconductor body comprising a p-type substrate 11 on which a p-type epitaxial layer 12 is formed. Inside epitaxial layer 12, an n-type region 14, a highly doped p-type region 15, and FD region 5 are implanted. Furthermore, an oxide layer 13 (e.g., silicon dioxide) is arranged on epitaxial layer 12. In this embodiment, transfer element 4 is realized as a transfer gate (e.g., made from polysilicon), spaced apart from epitaxial layer 12 by oxide layer 13.

Throughout the present disclosure, the term "pinned photodiode" or "PPD" may refer to a buried photodiode structure at least including region 14 and region 15. Such a structure may be able to convert incident photons into charge. Optionally, further elements such as transfer element 4 and/or FD region 5 may be considered comprised in the PPD. For convenience of explanation, however, the PPD is described separately from these optional further elements.

Region 14 in between epitaxial layer 12 and region 15 is typically fully depleted, as all the donor atoms are ionized and all electrons have been removed from this region, leaving a positive space charge from the donor atoms. When photons are incident on the PPD, photoelectrons are generated in the PPD and are attracted by the positive space charge. The transfer gate can be activated (e.g., biased positively) so the surface potential below the transfer gate is higher than the potential in region 14, thereby forming a conductive path below the transfer gate and between region 14 and FD region 5. The generated photoelectrons drift or diffuse towards this conductive path and are collected on FD region 5 and capacitor C, which are parallel to one another. The resulting signal across capacitor C and FD region 5 can be applied to column line COL via source follower Msf and row selection switch Msel by activating row selection switch Msel. FD region 5 and capacitor C can be reset to a predetermined potential (e.g., a reset potential Vrst) via reset switch Mrst prior to integration. To that end, pixel controller 131 may provide a reset control signal RST to actuate reset switch Mrst and a selection control signal SEL to actuate row selection switch Msel.

In this example, capacitor C represents first storage element 2a of FIG. 2, and the PPD forms second storage element 2b of FIG. 2. When the transfer gate is deactivated, the PPD is substantially electrically isolated from FD region 5 and capacitor C due to the absence of a conductive path below the transfer gate. In that case, any generated photoelectrons in the PPD will remain in the PPD until the transfer gate is activated and the generated photoelectrons are transferred to capacitor C. Accordingly, active pixel 1a can be controlled by pixel controller 131 to record a first signal associated with first X-rays having a first spectrum in capacitor C, and to record a second signal associated with second X-rays having a second spectrum in the PPD. This is further described below with reference to the exemplary timing diagrams of FIG. 6A-6E.

Throughout the present disclosure, when referring to 'recording' a signal in a PPD, this may also be referred to as integrating photons (e.g., X-rays or intermediate photons) and/or generating photoelectrons.

Figure 5B:
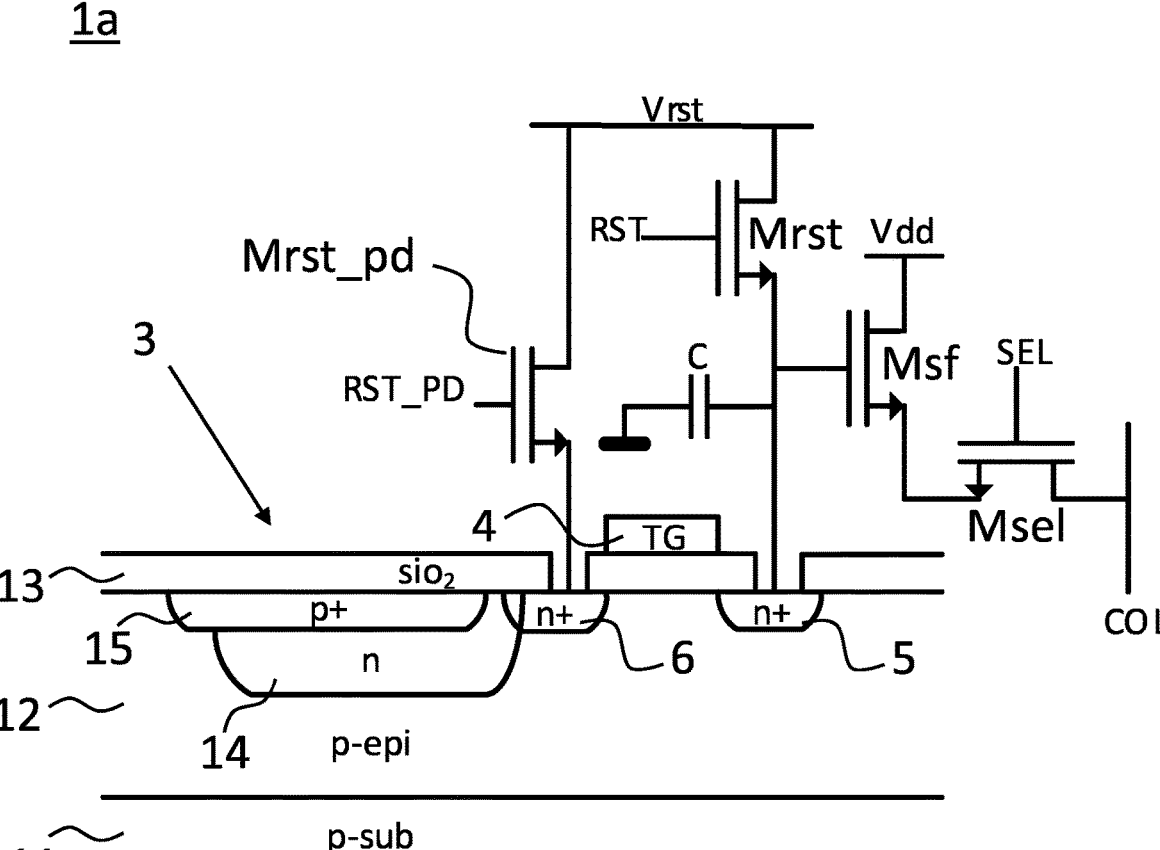

In FIG. 5B, active pixel 1a according to another embodiment of the present disclosure is shown. The embodiment of FIG. 5B differs from that of FIG. 5A in that a further FD region 6 is provided as a contact to the PPD. Further FD region 6 can be used as a primary collection point for generated photoelectrons.

Optionally, a further reset switch Mrst_pd is provided which can reset further FD region 6 to a predetermined potential (e.g., reset potential Vrst) to drain the PPD from charges. Alternatively, further reset switch Mrst_pd may be controlled by pixel controller 131 using a further reset control signal RST_PD to set a gate of further reset Mrst_pd at a dedicated potential such that further reset switch Mrst_pd acts as an antiblooming gate or an overflow drain. When the PPD is overexposed and the potential in the PPD drops too low, excess charges can be drained through further reset switch Mrst_pd.

It will be appreciated by the skilled person that the configurations shown in FIGS. 5A and 5B can be equally realized by swapping n-type regions with p-type regions and vice versa.

Figure 6A:
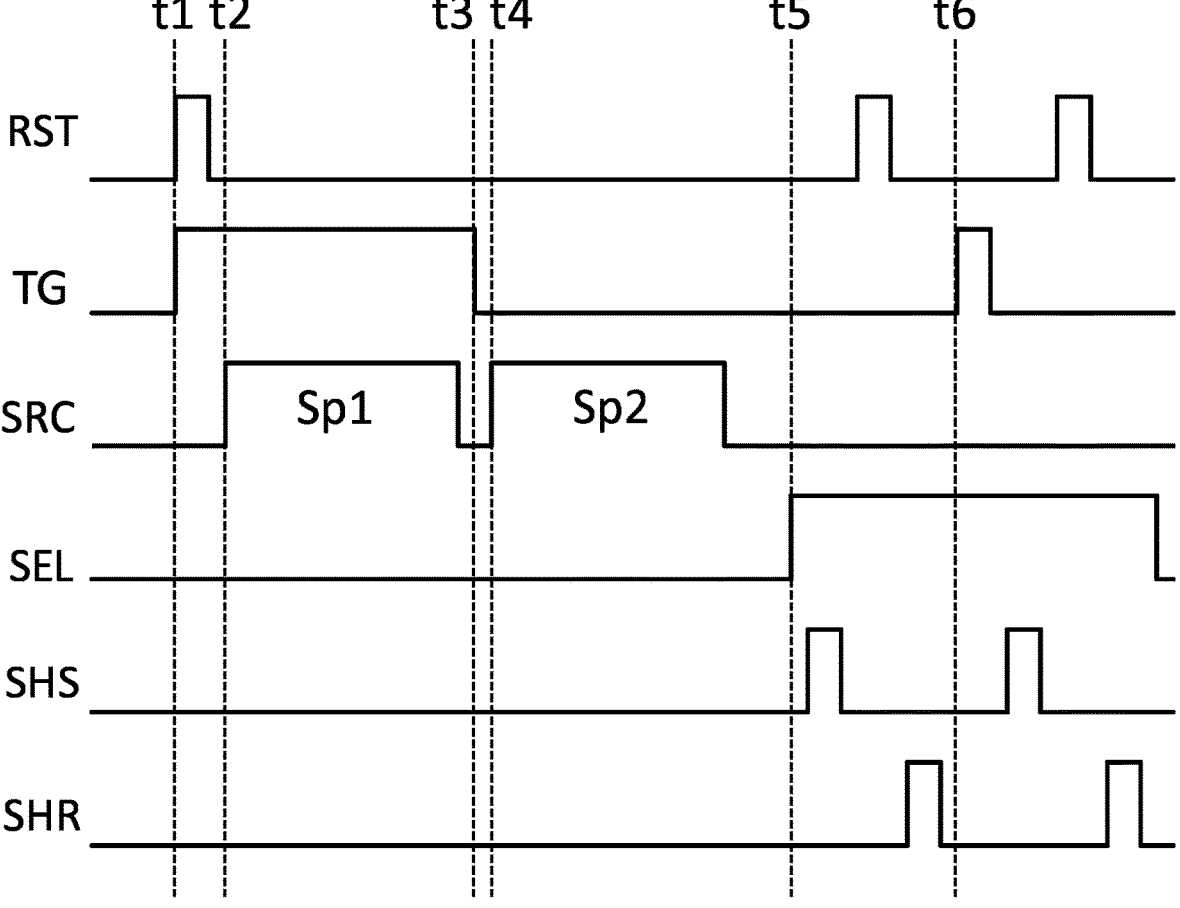
FIG. 6A-6E are exemplary timing diagrams of control signals for the active pixels of FIG. 5A or 5B.

FIG. 6A illustrates a first exemplary timing diagram for active pixel 1*a* of FIG. 5A or 5B. In particular, this diagram shows reset control signal RST, transfer gate control signal TG, an output SRC of X-ray source 110, selection control signal SEL, a sample-and-hold-start signal SHS, and a sample-and-hold reset signal SHR.

At time instance t1, active pixel 1*a* is reset using RST. Since TG is high while RST is high, the potential of both capacitor C and the PPD is reset. Here, RST and TG may be provided to all active pixels in pixel array 133 to reset or initialize the entire array. In this embodiment, after the reset, TG is kept high, allowing generated photoelectrons to be transferred immediately from the PPD to capacitor C.

Starting from time instance t2, first X-rays of first spectrum Sp1 are emitted as indicated using SRC. Charges from PPD are transferred to capacitor C, thereby recording a first (voltage) signal across capacitor C (i.e., first storage element 2*a*). After integrating first X-rays, at time instance t3, TG is made low, thereby deactivating transfer element 4 and decoupling the PPD from capacitor C.

Starting from time instance t4, second X-rays of second spectrum Sp2 are emitted. The charges generated are now held inside the PPD, thereby recording a second signal in the PPD (i.e., second storage element 2*b*). After integrating the second X-rays, both the first signal and the second signal have been recorded by active pixel 1*a*.

At time instance t5, SEL is made high to apply the signal across capacitor C to column line COL. This enables readout unit 132 to perform the readout of the recorded first signal. The recorded first signal is read out by readout unit 132 using differential double sampling. First, the recorded first signal is sampled by readout unit 132 when SHS is high. Subsequently, capacitor C is reset by RST, and the reference level is sampled by readout unit 132 when SHR is high. This completes the readout of the recorded first signal. Note that RST in this case is applied only to active pixels 1*a* of pixel array 133 which have been sampled when SHS is high, e.g., individually or on a row-by-row basis.

At time instance t6, a TG pulse is provided, causing the photoelectrons that are stored inside the PPD to be transferred to FD region 5 and capacitor C via transfer element 4. The charges transferred from the PPD cause a signal voltage to develop across capacitor C that is associated with the second X-rays. This signal voltage can be subsequently sampled using differential double sampling in a manner analogous to the recorded first signal, i.e., using SHS and SHR as shown in FIG. 6A.

The readout process for the recorded first signal and the recorded second signal is repeated for each row of pixel array 133 until all active pixels 1*a* have been read out. For example, after completing the readout of the recorded first signal and the recorded second signal for a first active pixel as shown in FIG. 6A, SEL is made low for that pixel, and is made high for subsequent pixel in a subsequent row of pixel array 133.

It is noted that, with this timing diagram, transfer element 4 connects the PPD to capacitor C during integration of X-rays of first spectrum Sp1. During exposure to first spectrum Sp1, all charge carriers generated in the PPD substantially immediately travel to capacitor C. Therefore, for first spectrum Sp1, active pixel 1*a* can typically have a larger full well capacity, i.e., more charges can be stored. For second spectrum Sp2, the full well capacity is limited by the charge storage capacity of the PPD. It is therefore practical to use as first spectrum Sp1 a spectrum that is expected to generate the largest signal.

Figure 6B:
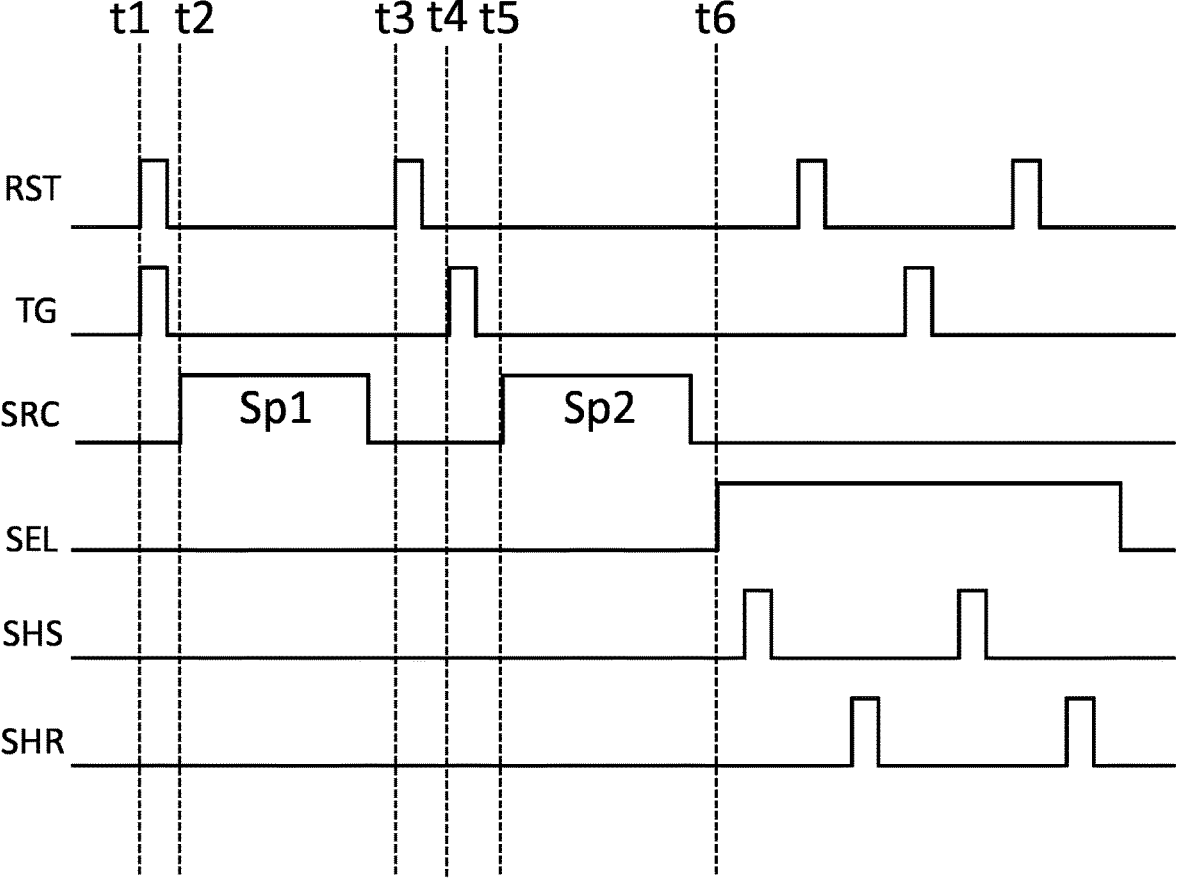

FIG. 6B illustrates a second exemplary timing diagram for active pixel 1*a* of FIG. 5A or 5B. This timing diagram differs from the timing diagram of FIG. 6A in that TG is not kept high during emitting of first X-rays having first spectrum Sp1.

At time instance t1, a RST and TG pulse are provided substantially simultaneously before emitting first X-rays of first spectrum Sp1 to initialize active pixel 1*a*. Starting from instance t2, as illustrated using SRC, first X-rays of first spectrum Sp1 are integrated to temporarily record a first signal in the PPD. At time instance t4, TG is made high to transfer the generated photoelectrons from the PPD to capacitor C to record the first signal in capacitor C. Optionally, at time instance t3. RST is first made high to ensure that capacitor C is properly initialized before transferring the recorded first signal to capacitor C. After transferring the recorded first signal to capacitor C, TG is made low again and, from time instance t5, second X-rays of second spectrum Sp2 can be integrated in the PPD to record the second signal in the PPD. After integrating second X-rays of second spectrum Sp2, the recorded first signal and the recorded second signal can be sequentially read out as illustrated from time instance t6, for example using correlated double sampling or differential double sampling.

Figure 6C:
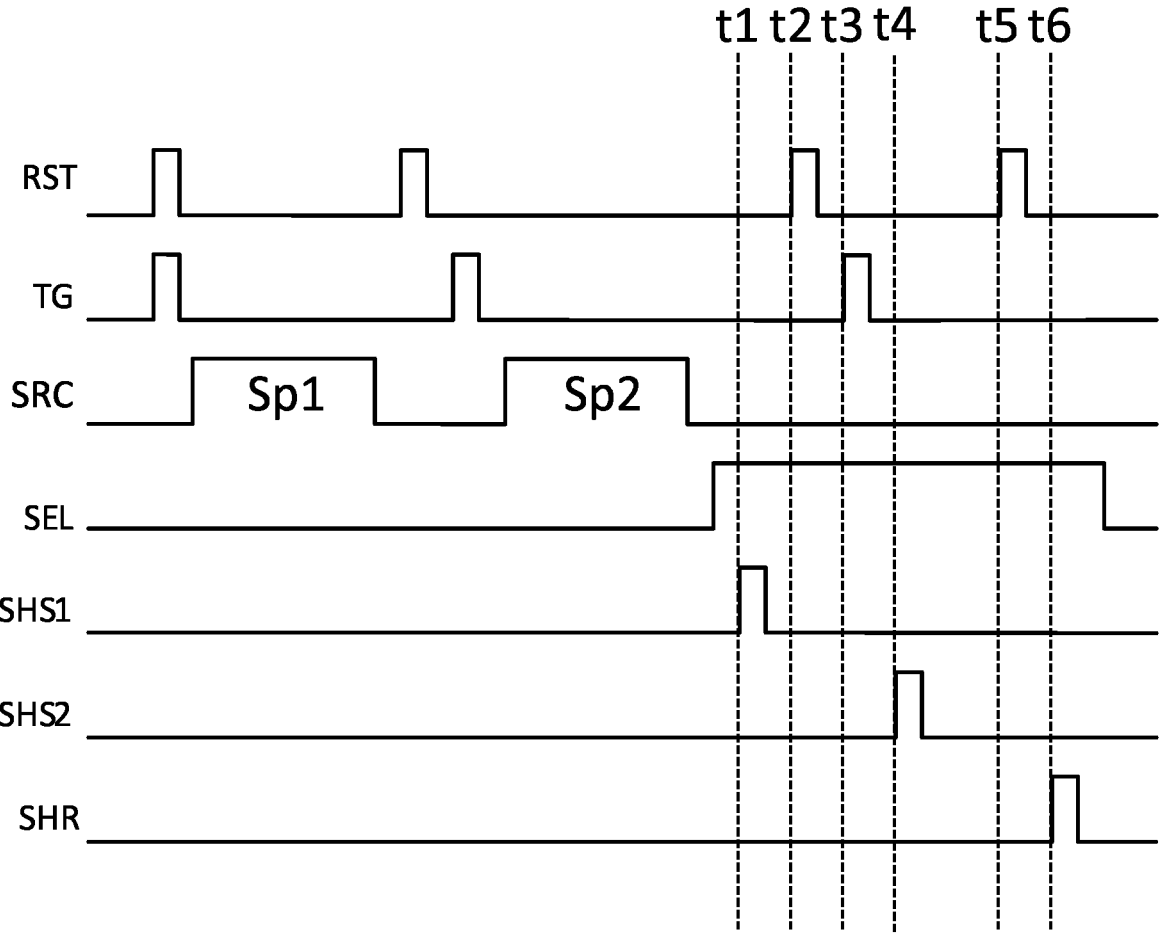

FIG. 6C illustrates a third exemplary timing diagram for active pixel 1*a* of FIG. 5A or 5B. This timing diagram differs from that of FIG. 6B in that the same reset sample is used for both the recorded first signal and the recorded second signal, instead of using two different reset samples for CDS.

In particular, after recording both the first signal and the second signal, the recorded first signal is sampled by readout unit 132 when SHS1 is high, i.e., at time instance t1. At time instance t2, capacitor C is reset using RST to prepare capacitor C for receiving the recorded second signal. At time instance t3, the recorded second signal is transferred from the PPD to capacitor C via transfer element 4 using a TG pulse. At time instance t4, the recorded second signal is sampled by readout unit 132 when SHS2 is high. At time instance t5, capacitor C is reset using RST. Finally, at time instance t6, a reference level is sampled by readout unit 132 when SHR is high. Readout unit 132 can then use the samples taken when SHS1 and SHR were high to process the recorded first signal, and use the samples taken when SHS2 and SHR were high to process the recorded second signal. Again, the readout process can be repeated for each row of active pixels using SEL.

Figure 6D:
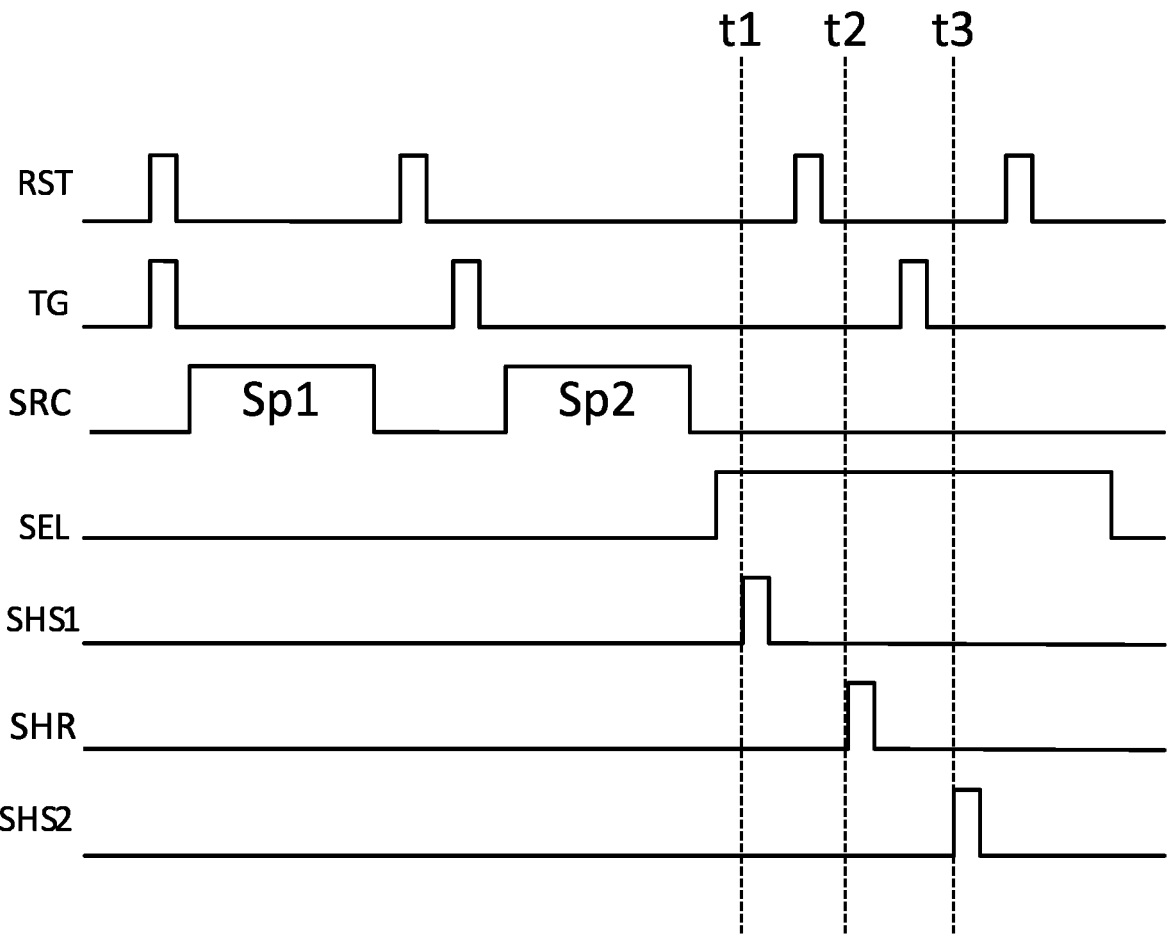

FIG. 6D illustrates a fourth exemplary timing diagram for active pixel 1*a* of FIG. 5A or 5B. This timing diagram differs from that of FIG. 6C in that the reference level is sampled by readout unit 132 at time instance t2, i.e., in between sampling the recorded first signal when SHS1 is high at time instance t1 and sampling the recorded second signal when SHS2 is high at time instance t3. Here, the recorded first signal is therefore sampled using differential double sampling, whereas the recorded second signal is sampled using correlated double sampling.

Figure 6E:
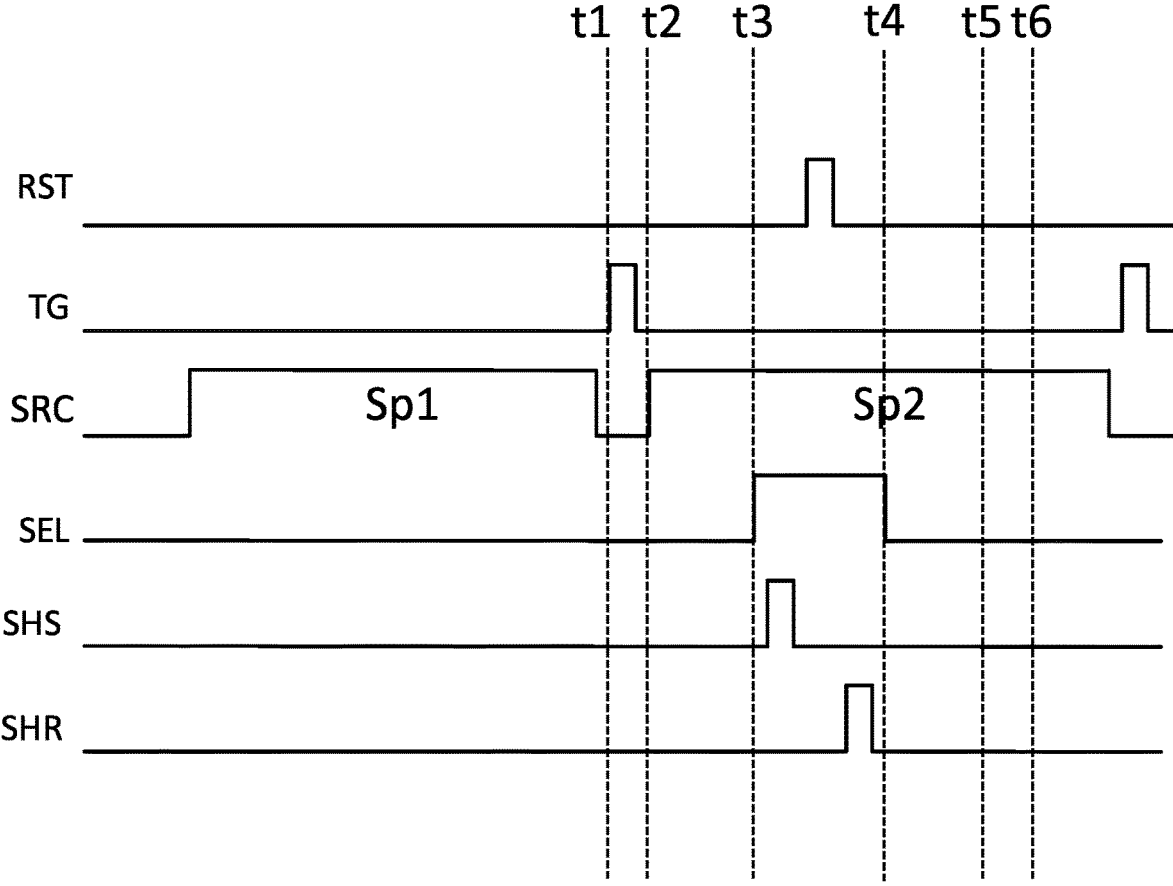

FIG. 6E illustrates a fifth exemplary timing diagram for active pixel 1a of FIG. 5A or 5B. This timing diagram differs from those shown in FIG. 6A-6D in that the recorded first signal is read out during the recording of the second signal, rather than afterwards.

In particular, after generating photoelectrons in the PPD and, at time instance t1, transferring them to capacitor C via transfer element 4 when TG is high to record the first signal, integration of second X-rays of second spectrum Sp2 is started at time instance t2 with TG being low to electrically isolate the PPD and capacitor C. During the integration of the second X-rays in the PPD, i.e., during recording of the second signal, the recorded first signal is already read out by readout unit 132 starting from time instance t3, as illustrated using SEL, SHS and SHR. Although not shown in FIG. 6E, after recording the second signal, readout unit 132 can read out the recorded second signal in a similar fashion using SEL, SHS and SHR. Optionally, the readout of the recorded second signal can be performed during another integration, such as the integration of third X-rays of third spectrum Sp3 as illustrated in FIGS. 4B and 4C, the integration of first X-rays of first spectrum Sp1 of a subsequent frame as illustrated in FIG. 4A, or the like.

It should be noted that the timing diagrams shown in FIG. 6A-6E are merely exemplary and do not in any way represent the only possible implementations of controlling active pixel 1a as shown in FIGS. 5A and 5B. Further or alternative implementations are derivable from the implementations of FIGS. 6A-6E and the active pixel illustrated in FIGS. 5A and 5B, taking into account the disclosure with reference to FIGS. 1-4C, as will be appreciated by the skilled person.

Figure 7A:
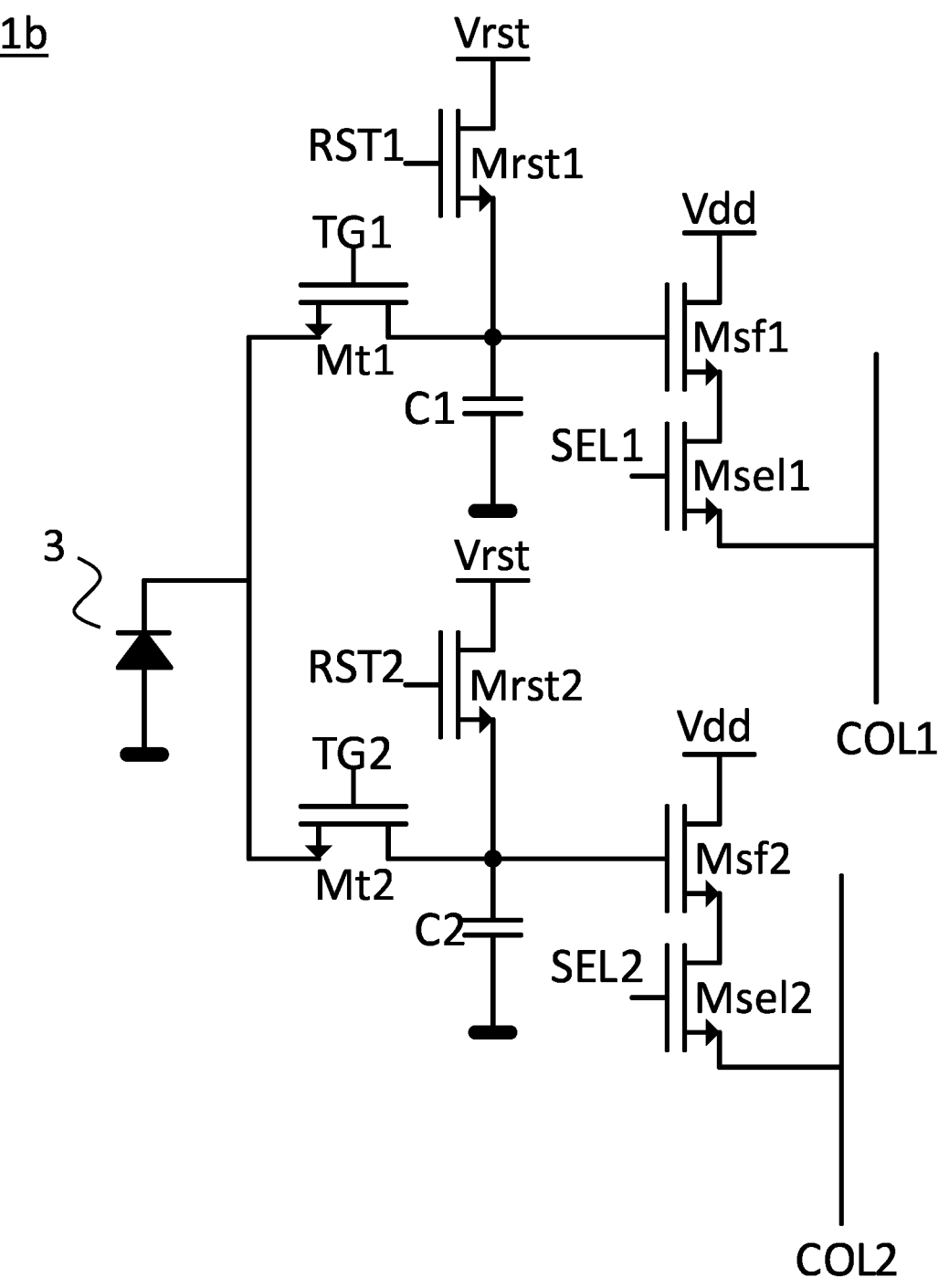
FIG. 7A-7C are schematic diagrams of an active pixel according to various embodiments of the present disclosures.

FIG. 7A illustrates an active pixel 1b according to another embodiment of the present disclosure. Active pixel 1b includes a photodetector 3 configured to convert incident photons into charge, a first transfer element Mt1, a second transfer element Mt2, a first capacitor C1 and a second capacitor C2. Furthermore, active pixel 1a may include a first reset switch Mrst1, a first source follower Msf1, and a first row selection switch Msel1 that are associated with first capacitor C1, and may include a second reset switch Mrst2, a second source follower Msf2, and a second row selection switch Msel2 that are associated with second capacitor C2.

Here, first capacitor C1 may represent first storage element 2a of active pixel 1 of FIG. 2, and second capacitor C2 may represent second storage element 2b of active pixel 1 of FIG. 2. In particular, a first signal associated with the first X-rays having the first spectrum may be recorded in first capacitor C1, and a second signal associated with the second X-rays having the second spectrum may be recorded in second capacitor C2. Photoelectrons generated by photodetector 3 may be transferred to first capacitor C1 via first transfer element Mt1, or to second capacitor C2 via second transfer element Mt2. This is further described below with reference to the exemplary timing diagrams of FIG. 8A-8C.

In this embodiment, first capacitor C1 is coupled via first source follower Msf1 and first row selection switch Msel1 to a first column line COL1 of a pixel array (e.g., pixel array 133 of FIG. 2), and second capacitor C2 is coupled via second source follower Msf2 and second row selection switch Msel2 to a second column line COL2 of the pixel array. Readout unit 132 may have a processing branch (e.g., processing circuitry 132a, 132b) for each of first column line COL1 and second column line COL2 if both column lines COL1, COL2 should be read out substantially simultaneously. Alternatively, if first column line COL1 and second column line COL2 are read out sequentially, a single processing circuitry of readout unit 132 can be coupled to both column lines COL1, COL2.

In this embodiment, pixel controller 131 is configured to provide respective reset control signals RST1, RST2 to reset switches Mrst1, Mrst2, and to provide respective selection control signals SEL1, SEL2 to row selection switches Msel1, Msel2. In addition, pixel controller 131 is configured to provide respective transfer control signals TG1, TG2 to transfer elements Mt1, Mt2.

Although not shown in FIG. 7A, active pixel 1b may be further extended to include additional capacitors, representing additional storage elements of the active pixel, each with corresponding reset switches, source followers, and row selection switches. Such an active pixel may for example be used to implement the embodiment described with reference to FIG. 4B.

Figure 7B:
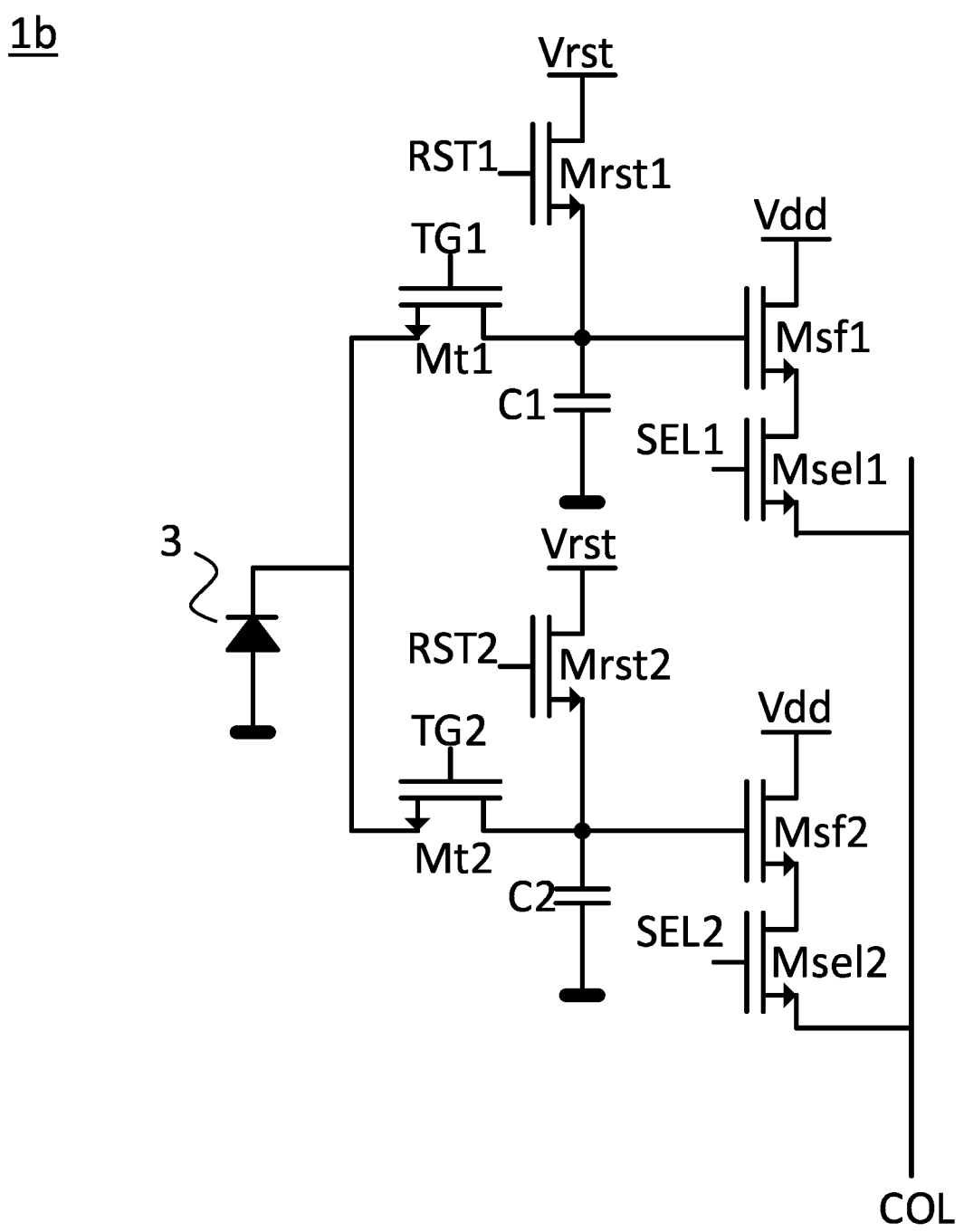

FIG. 7B illustrates active pixel 1b according to another embodiment of the present disclosure. The embodiment shown in FIG. 7B differs from that shown in FIG. 7A in that a single column line COL is used for reading out the signal recorded on first capacitor C1 and the signal recorded on second capacitor C2. In other words, the second column line and the first column line of FIG. 7A are the same column line. Wiring from pixel array 133 to readout unit 132 is thereby simplified and more efficiently implemented.

Figure 7C:
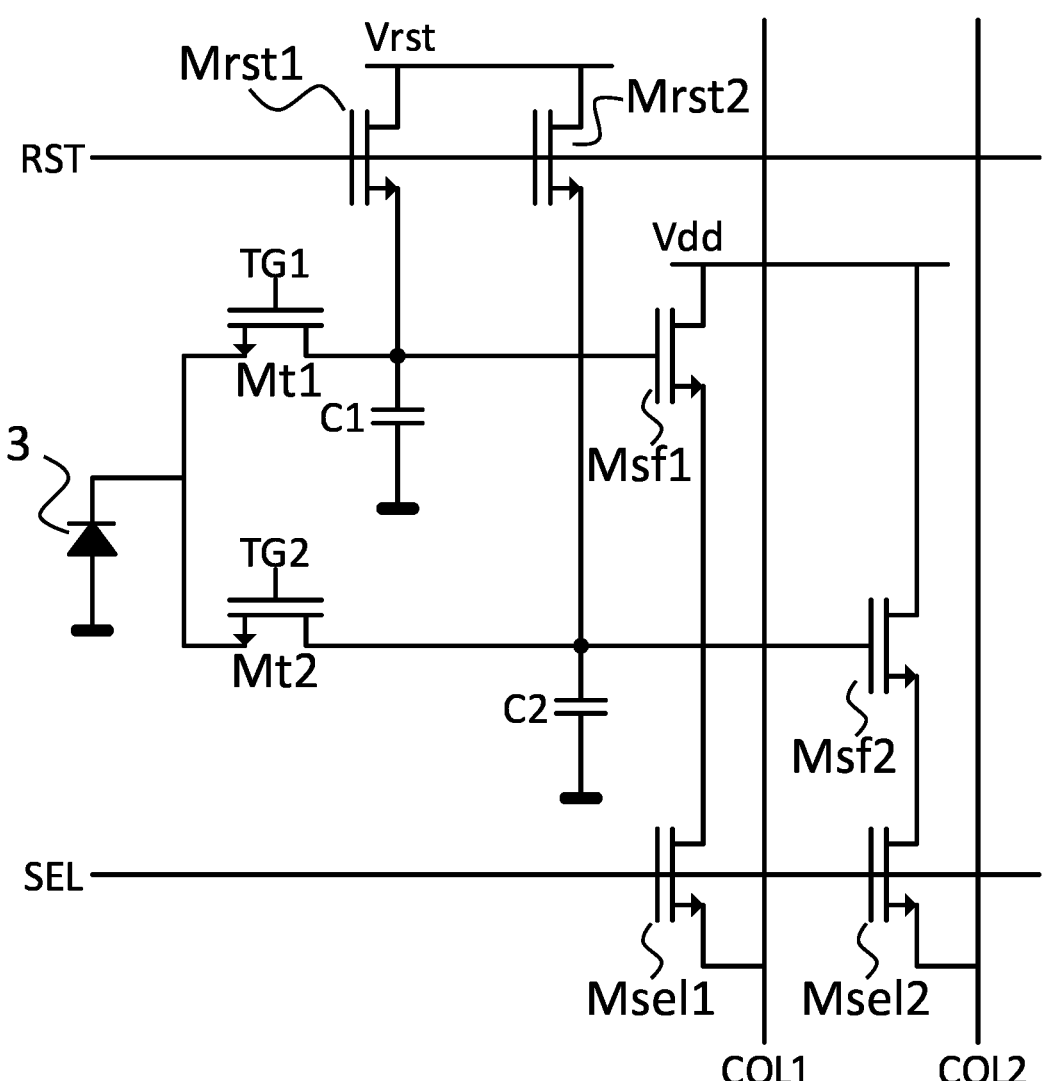

FIG. 7C illustrates active pixel 1b according to another embodiment of the present disclosure. The embodiment shown in FIG. 7C differs from that shown in FIG. 7A in that the same reset control signal RST is provided to both reset switches Mrst1, Mrst2, and in that the same selection control signal SEL is provided to both row selection switches Msel1, Msel2. Wiring from pixel controller 131 to each active pixel 1b in pixel array 133 is thereby simplified and more efficiently implemented.

In this embodiment, using selection control signal SEL, the recorded first signal in first capacitor C1 and the recorded second signal in second capacitor C2 can be applied to first column line COL1 and second column line COL2 substantially simultaneously, where they can be read out by readout unit 132. Afterwards, using reset control signal RST, first capacitor C1 and second capacitor C2 can be reset substantially simultaneously.

It is noted that photodetector 3 of FIG. 7A-7C may be a PPD as shown in FIGS. 5A and 5B. Moreover, when active pixel 1b is implemented using a PPD, active pixel 1b may include FD regions associated with each capacitor C1, C2 similar to FD region 5 of FIG. 5A, such that first and second transfer elements Mt1, Mt2 can both be implemented as transfer gates in a similar fashion as transfer element 4 in FIG. 5B. Moreover, if a further FD region or respective further FD regions associated with each capacitor C1, C2 are included in a similar fashion to further FD region 6 of FIG. 5B, first and second transfer elements Mt1, Mt2 may be implemented as MOS transistors, wherein the corresponding FD region and further FD region for the drain and source of the transistors. However, it should be noted that the embodiments shown in FIG. 7A-7C are not limited to active pixels 1b using PPD technology, and that other types of photodetectors may be used instead.

Figure 8A:
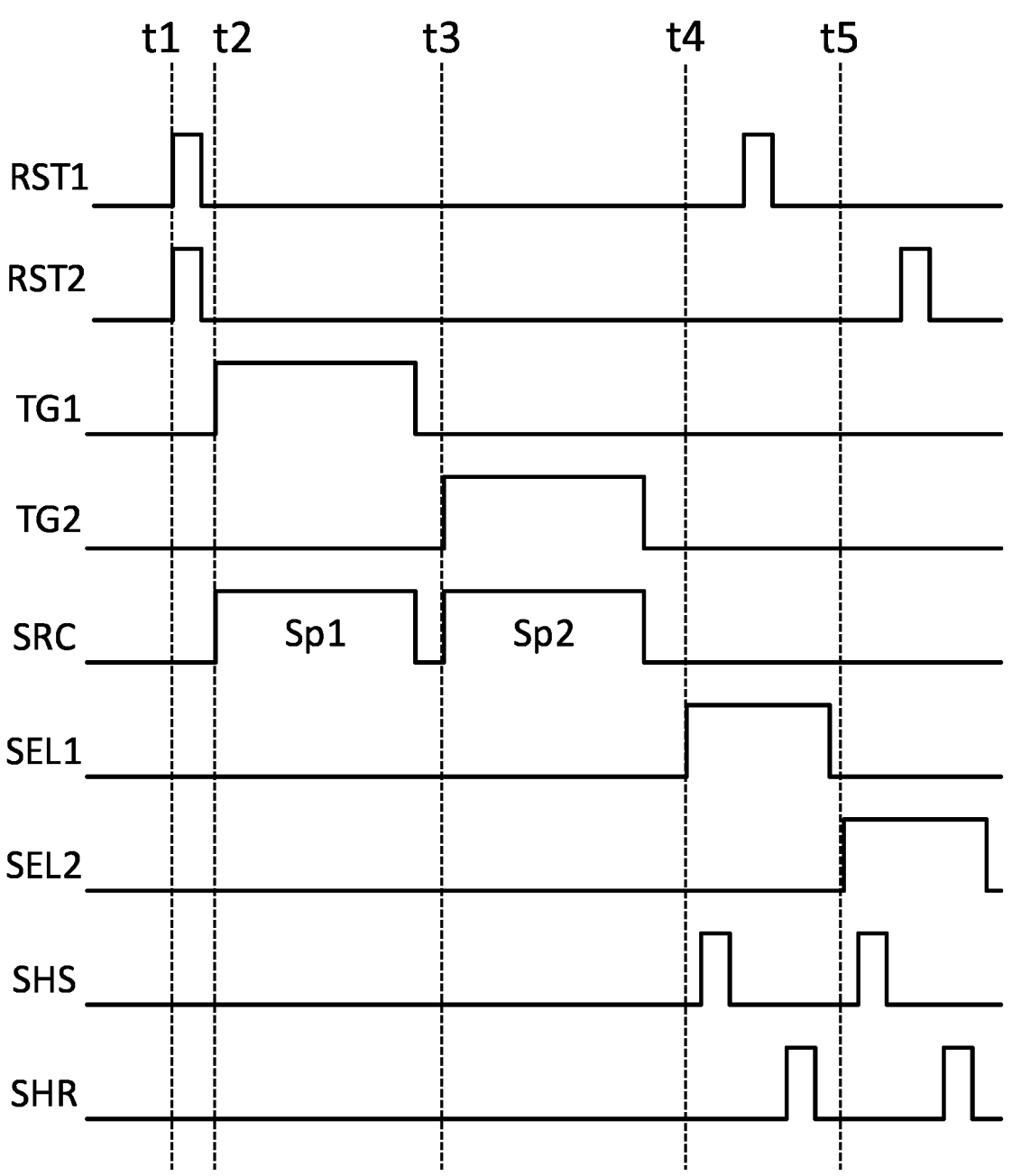
FIG. 8A-8C are exemplary timing diagrams of control signals for the active pixels of FIG. 7A-7C.

FIG. 8A illustrates a first exemplary timing diagram applicable to active pixel 1b as shown in FIG. 7A-7C.

At time instance t1, both first capacitor C1 and second capacitor C2 are reset using RST1 and RST2, respectively. At time instance t2, first X-rays of first spectrum Sp1 are integrated in photodetector 3 and a first signal associated with the first X-rays is recorded in first capacitor C1 via first transfer element Mt1, which is activated by TG1. At time instance t3, second X-rays of second spectrum Sp2 are integrated in photodetector 3 and a second signal associated with the second X-rays is recorded in second capacitor C2 via second transfer element Mt2, which is activated by TG2. This process may be applied globally for all active pixels 1b in pixel array 133.

After recording both the first and second signal, at time instance t4, the recorded first signal is applied to first column line COL1 using SEL1. Readout unit 132 then samples the recorded first signal using SHS. Afterwards, first capacitor C1 is reset using RST1, and readout unit 132 samples a reference level using SHR. Subsequently, at time instance t5, the recorded second signal is applied to second column line COL2, and readout unit 132 samples the recorded second signal using SHS. Afterwards, second capacitor C2 is reset using RST2, and readout unit 132 samples a reference level using SHR. This process of sampling the signal during SHS and sampling the reference level during SHR is applied to individual active pixels 1b or on a row-by-row basis, until all active pixels 1b have been read out.

Referring to active pixel 1b of FIG. 7A, instead of sequentially reading out the recorded first signal and the recorded second signal as described above, readout unit 132 may be configured to read out the recorded first signal via first column line COL1 and the recorded second signal via second column line COL2 substantially simultaneously. In that case, pixel controller 131 would provide a high SEL1 and SEL2 substantially simultaneously.

Figure 8B:
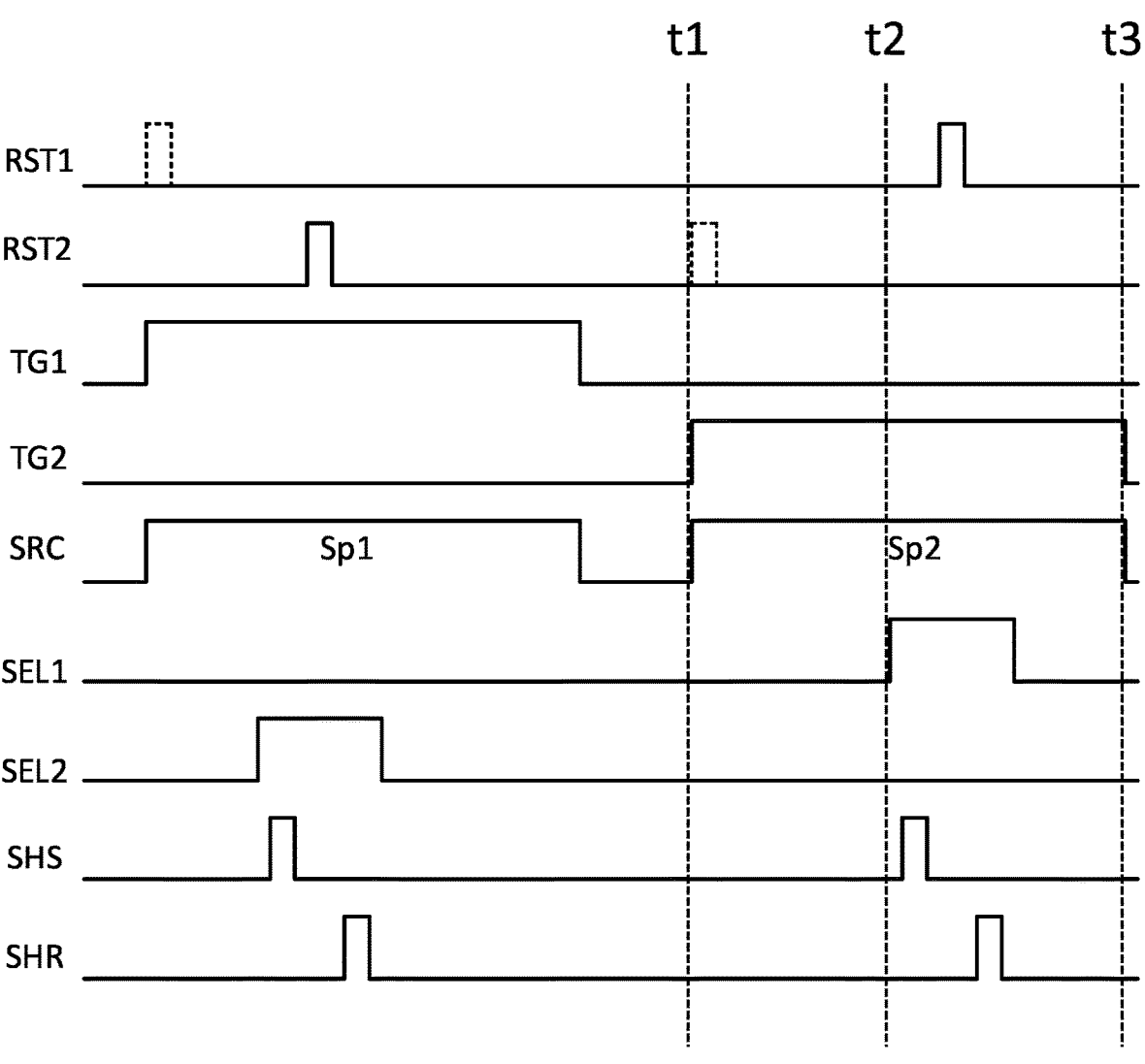

FIG. 8B illustrates a second exemplary timing diagram applicable to active pixel 1b as shown in FIG. 7A or 7B. The timing diagram of FIG. 8B differs from that of FIG. 8A in that readout unit 132 is configured to, at time instance t2, read out the recorded first signal already while recording the second signal between time instances t1 and t3. Similarly, although not shown in FIG. 8B, the readout unit 132 can read out the recorded second signal while recording a third signal associated with third X-rays, or a first signal associated with first X-rays of a subsequent frame. For example, active pixel 1a can alternatingly record a signal in one of first and second capacitor C1, C2 and apply a recorded signal of another of first and second capacitor C1, C2, to column line COL or its corresponding first or second column line COL1, COL2 for readout.

Here, the solid RST1 and RST2 pulses that are applied between the SHS and SHR pulses are applied to active pixels 1b on an individual or row-by-row basis, to ensure that only pixels that are being read out are reset to take a sample of the reset level during the SHR pulse. The dashed RST1 and RST2 pulses are optional global reset pulses, which may be applied substantially simultaneously to all active pixels 1b of pixel array 133, to reset capacitors C1, C2 before the integration starts or at the start of the integration.

Figure 8C:
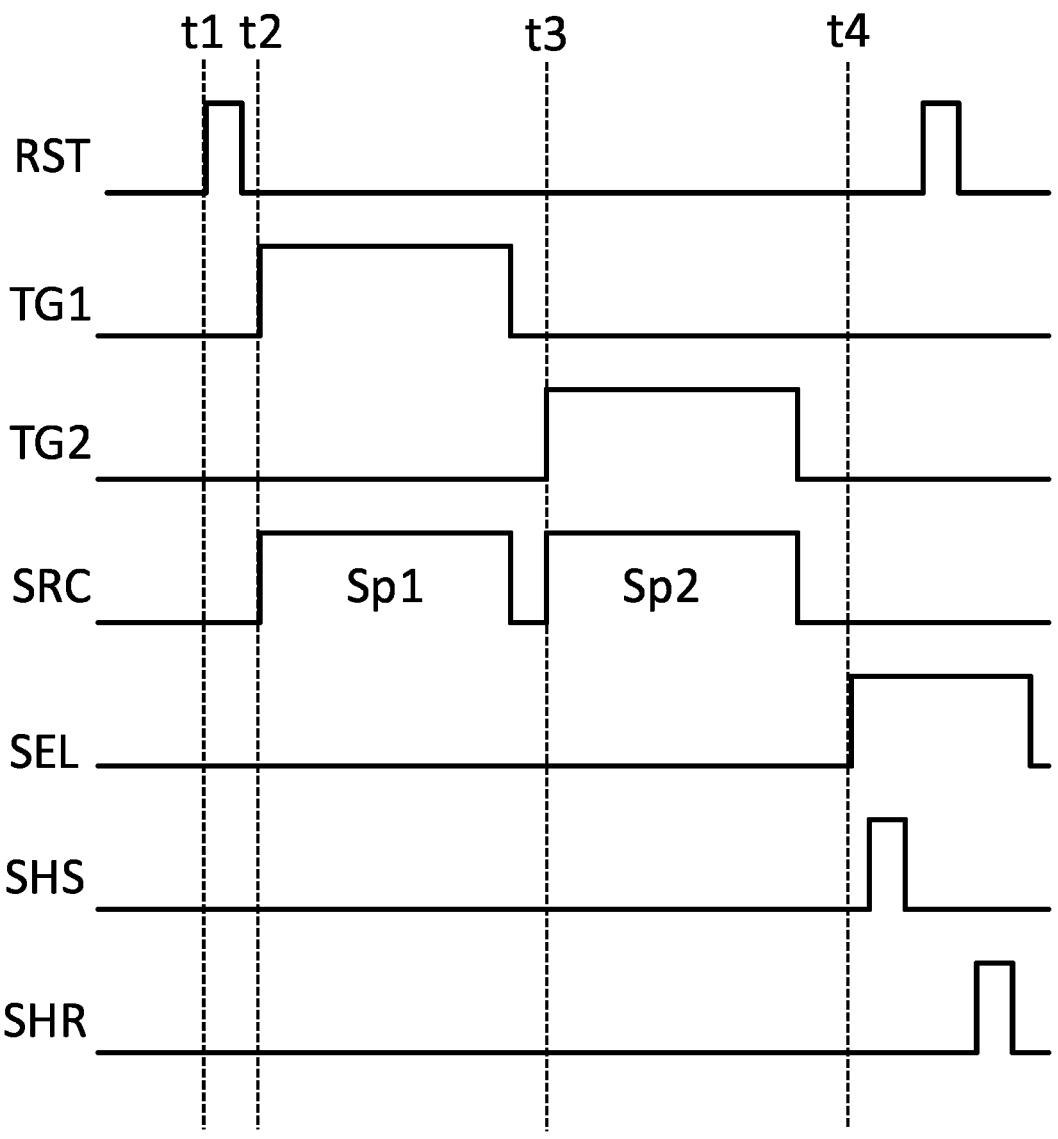

FIG. 8C illustrates a third exemplary timing diagram applicable to active pixel 1b as shown in FIG. 7C.

At time instance t1, first and second capacitors C1, C2 are reset substantially simultaneously using RST. From time instance t2, as illustrated using SRC, a first signal associated with the first X-rays is recorded in first capacitor C1 using TG1 to transfer photoelectrons from photodetector 3 to first capacitor C1 via first transfer element Mt1. From time instance t3, as illustrated using SRC, a second signal associated with the second X-rays is recorded in second capacitor C2 using TG2 by transferring photoelectrons from photodetector 3 to second capacitor C2 via second transfer element Mt2. From time instance t4, the recorded first signal is applied to first column line COL1 and the recorded second signal is applied to second column line COL2 using SEL. Readout unit 132 can then sample the recorded first signal and the recorded second signal substantially simultaneously using SHS. Finally, first and second capacitor C1, C2 are reset again using RST (i.e., individually for each active pixel 1b that is being read out, or on a row-by-row basis for each row that is being read out), and readout unit samples a reference level using SHR.

It should be noted that the timing diagrams shown in FIG. 8A-8C are merely exemplary and do not in any way represent the only possible implementations of controlling active pixel 1a as shown in FIG. 7A-7C. Further or alternative implementations are derivable from the implementations of FIGS. 8A-8C and the active pixel illustrated in FIG. 7A-7C, taking into account the disclosure with reference to FIGS. 1-4C, as will be appreciated by the skilled person.

FIG. 9 illustrates a method for multi-spectrum X-ray imaging in accordance with an embodiment of the present disclosure.

In operation S1, first X-rays having a first spectrum and second X-rays having a second spectrum different from the first spectrum are sequentially emitted.

In operation S2, an active pixel of an X-ray detector records a first signal associated with the first X-rays in a first storage element thereof, and records a second signal associated with the second X-rays in a second storage element thereof.

In operation S3, a readout unit of the X-ray detector reads out the recorded first signal during or after the recording of the second signal by the active pixel.

Further optional method steps can be derived from the description with reference to FIGS. 1-8C.

In the above, reset switches Mrst, Mrst1, Mrst2, source followers Msf, Msf1, Msf2, row selection switches Msel, Msel1, Msel2, and transfer elements Mt1, Mt2 may each be realized as metal-oxide-semiconductor field-effect transistors (MOSFETs).

The present disclosure may apply to both direct conversion photodetectors, which directly convert incident X-rays into charge, and indirect conversion photodetectors, in which a scintillator converts X-rays into intermediate light of a different spectrum that can subsequently be converted into charge by the detector.

The present disclosure may relate to any of the following clauses:

Clause 1. An X-ray system, comprising: an X-ray source configured to be sequentially operable in a plurality of spectral modes in dependence of at least one synchronization signal, the plurality of modes including a first mode, in which the X-ray source is configured to emit first X-rays having a first spectrum and a second mode, in which the X-ray source is configured to emit second X-rays having a second spectrum different from the first spectrum; and an X-ray detector comprising a pixel controller, a readout unit, and an active pixel, wherein the active pixel comprises a first storage element and a second storage element, wherein the pixel controller is configured to control the active pixel in dependence of the at least one synchronization signal to record a first signal associated with the first X-rays in the first storage element and record a second signal associated with the second X-rays in the second storage element, and wherein the readout unit is configured to read out the recorded first signal during or after the recording of the second signals by the active pixel.

Clause 2. The X-ray system according to clause 1, wherein the first storage element includes a first capacitor, and wherein the second storage element includes a second capacitor.

Clause 3. The X-ray system according to clause 2, wherein the active pixel further comprises: a photodetector configured to convert incident photons into charge; a first transfer element coupled between the photodetector and the first storage element; and a second transfer element coupled between the photodetector and the second storage element, wherein the pixel controller is configured to control the active pixel to activate the first transfer element to allow the active pixel to record the first signal in the first storage element, and to control the active pixel to activate the second transfer element to allow the active pixel to record the second signal in the second storage element.

Clause 4. The X-ray system according to clause 3, wherein the photodetector comprises a pinned photodiode, 'PPD', configured to temporarily hold a first charge associated with the first X-rays, and to temporarily hold a second charge associated with the second X-rays, wherein the pixel controller is configured to control the active pixel to transfer the first charge from the PPD to the first storage element by activating the first transfer element, and to control the active pixel to transfer the second charge from the PPD to the second storage element by activating the second transfer element.

Clause 5. The X-ray system according to clause 4, wherein the active pixel comprises a first floating diffusion, 'FD', region electrically connected to the first storage element and a second FD region electrically connected to the second storage element, wherein the first transfer element is coupled between the PPD and the first FD and wherein the second transfer element is coupled between the PPD and the second FD.

Clause 6. The X-ray system according to clause 5, wherein the PPD comprises a further FD region, wherein the first transfer element and/or the second transfer element is coupled between the further FD region and the first FD region and/or the second FD region, respectively, wherein, preferably, the first transfer element and/or the second transfer element is realized as a metal-oxide-semiconductor, 'MOS', transistor.

Clause 7. The X-ray system according to any of the clauses 1-6, wherein the active pixel further comprises: a first source follower and a first row selection switch that are coupled between the first storage element and a first column line of the X-ray detector; and a second source follower and a second row selection switch that are coupled between the second storage element and a second column line of the X-ray detector.

Clause 8. The X-ray system according to clause 7, wherein the first column line and the second column line are the same column line, or wherein the first column line and the second column line are electrically connected.

Clause 9. The X-ray system according to clause 8, wherein, after the active pixel has recorded both the first signal and the second signal: the pixel controller is configured to sequentially control the first and second row selection switch to allow the readout unit to read out the first and second signal, respectively; and the readout unit is configured to sequentially read out the recorded first signal and the recorded second signal, wherein the pixel controller is configured to subsequently control the active pixel to reset the first storage element and the second storage element, preferably substantially simultaneously.

Clause 10. The X-ray system according to clause 7 or 8, wherein, after the active pixel has recorded the first signal and while the active pixel is recording the second signal: the pixel controller is configured to control the first row selection switch to allow the readout unit to read out the recorded first signal; and the readout unit is configured to read out the recorded first signal while the active pixel is recording the second signal, wherein the pixel controller is configured to subsequently control the active pixel to reset the first storage element.

Clause 11. The X-ray system according to clause 10, wherein, after the active pixel has recorded the second signal: the pixel controller is configured to control the second row selection switch to allow the readout unit to read out the recorded second signal; and the readout unit is configured to read out the recorded second signal, wherein the pixel controller is configured to subsequently control the active pixel to reset the second storage element.

Clause 12. The X-ray system according to clause 7, wherein, after the active pixel has recorded both the first signal and the second signal: the pixel controller is configured to control the first and second row selection switch to allow the readout unit to read out the first and second signal, respectively; and the readout unit is configured to read out the recorded first signal and the recorded second signal, preferably substantially simultaneously, wherein the pixel controller is configured to subsequently control the active pixel to reset the first storage element and the second storage element, preferably substantially simultaneously.

Clause 13. The X-ray system according to any of the clauses 1-12, wherein the readout unit is configured to perform correlated double sampling, 'CDS', or differential double sampling, 'DDS', as part of reading out the recorded first signal and the recorded second signal.

Clause 14. The X-ray system according to clause 1, wherein the active pixel comprises: a photodetector, being a pinned photodiode, 'PPD', configured to convert incident photons into charge; and a transfer element coupled between the PPD and the second storage element, wherein the first storage element includes a capacitor, and wherein the second storage element is at least partially formed by the PPD.

Clause 15. The X-ray system according to clause 14, wherein the second storage element is configured to temporarily hold a first charge associated with the first X-rays, and wherein the pixel controller is configured to control the active pixel to record the first signal in the first storage element by transferring the first charge from the second storage element to the first storage element using the transfer element.

Clause 16. The X-ray system according to clause 14 or 15, wherein, after transferring the first charge from the PPD to the first storage element, the second storage element is configured to record the second signal by holding a second charge corresponding to the second signal associated with second X-rays.

Clause 17. The X-ray system according to clause 16, wherein, while the active pixel is recording the second signal in the second storage element, the readout unit is configured to read out the recorded first signal from the first storage element, and wherein, after the readout unit has read out the recorded first signal, the pixel controller is configured to control the active pixel to reset the first storage element.

Clause 18. The X-ray system according to clause 17, wherein, after the active pixel has recorded the second signal in the second storage element, the pixel controller is configured to control the transfer element to transfer the second charge from the second storage element to the first storage element, wherein the readout unit is configured to read out the recorded second signal from the first storage element, and wherein, after the readout unit has read out the recorded second signal, the pixel controller is configured to control the active pixel to reset the first storage element.

Clause 19. The X-ray system according to clause 16, wherein, after the active pixel has recorded the second signal in the second storage element: the readout unit is configured to read out the recorded first signal from the first storage element; the pixel controller is configured to subsequently control the active pixel to reset the first storage element and transfer the second charge from the second storage element to the first storage element using the transfer element; and the readout unit is configured to subsequently read out the recorded second signal from the first storage element.

Clause 20. The X-ray system according to any of the clauses 14-19, wherein the readout unit is configured to read out the recorded first signal and/or the recorded second signal using correlated double sampling (CDS) or differential double sampling (DDS).

Clause 21. The X-ray system according to clauses 19 and 20, wherein the readout unit is configured to use a same reference sample of the CDS or DDS for both the recorded first signal and the recorded second signal.

Clause 22. The X-ray system according to any of the clauses 14-21, wherein the active pixel further comprises a source follower and a row selection switch coupled between the first storage element and a column line of the X-ray detector, wherein the pixel controller is configured to activate the row selection switch to allow the readout unit to read out a signal from the first storage element.

Clause 23. The X-ray system according to any of the clauses 14-22, wherein the active pixel comprises a floating diffusion, 'FD', region to which the first storage element is coupled, wherein the transfer element is coupled between the PPD and the FD region, or wherein the FD region forms part of the transfer element.

Clause 24. The X-ray system according to clause 23, wherein the PPD comprises a further FD region, wherein, preferably, the transfer element is realized as a metal-oxide-semiconductor, 'MOS', transistor, the FD region and the further FD region corresponding to a drain and a source of the MOS transistor, respectively.

Clause 25. The X-ray system according to any of the clauses 1-24, wherein the active pixel comprises a first reset switch for resetting the first storage element and/or a second reset switch for resetting the second storage element.

Clause 26. The X-ray system according to any of the clauses 1-25, wherein the readout unit comprises an analog-to-digital converter, 'ADC', to convert the recorded first signal and the recorded second signal into digital signals as at least part of reading out the recorded first signal and recorded second signal.

Clause 27. The X-ray system according to any of the clauses 1-26, wherein the X-ray detector comprises a plurality of said active pixels, preferably arranged in a matrix of rows and columns.

Clause 28. The X-ray system according to any of the clauses 1-27, wherein the pixel controller is configured to control the readout unit in dependence of the at least one synchronization signal.

Clause 29. The X-ray system according to any of the clauses 1-28, wherein the at least one synchronization signal includes one or more signals indicative of at least one of: a start of operating in the first mode by the X-ray source; a termination of operating in the first mode by the X-ray source; a start of operating in the second mode by the X-ray source; a termination of operating in the second mode by the X-ray source; a completion of recording the first signals by the active pixel; a completion of recording the second signals by the active pixel; a completion of reading out the first signals by the readout unit; and a completion of reading out the second signals by the readout unit.

Clause 30. The X-ray system according to any of the clauses 1-29, wherein the X-ray detector, preferably the pixel controller, is configured to generate at least one of the at least one synchronization signal; and/or wherein the X-ray source is configured to generate at least one of the at least one synchronization signal; and/or wherein the X-ray system further comprises a controller configured to generate at least one of the at least one synchronization signal for the X-ray source and/or the X-ray detector.

Clause 31. The X-ray system according to any of the clauses 1-30, wherein the readout unit is configured to read out the recorded second signal during the recording of another first signal associated with the first X-rays of a subsequent frame among a plurality of frames to be recorded by the X-ray detector.

Clause 32. The X-ray system according to any of the clauses 1-31, wherein the X-ray detector is configured to alternatingly record a signal in one of the first and second storage element while reading out a previously recorded signal from another of the first and second storage element.

Clause 33. The X-ray system according to any of the clauses 1-32, wherein the X-ray detector or the X-ray system further comprises an image processing unit configured to generate spectral images corresponding to the first spectrum and the second spectrum based on data read out by the readout unit.

Clause 34. An X-ray detector configured as the X-ray detector as defined in any of the previous claims.

Clause 35. An active pixel configured as the active pixel as defined in any of the clauses 1-33.

Clause 36. A pixel controller configured as the pixel controller as defined in any of the clauses 1-33.

Clause 37. A method for multi-spectrum X-ray imaging, comprising: sequentially emitting, by an X-ray source, first X-rays having a first spectrum and second X-rays having a second spectrum different from the first spectrum; recording, by an active pixel of an X-ray detector, a first signal associated with the first X-rays in a first storage element of the active pixel, and a second signal associated with the second X-rays in a second storage element of the active pixel, reading out, by a readout unit of the X-ray detector, the recorded first signal during or after the recording of the second signal by the active pixel.

Features which are described in the context of separate embodiments may also be provided in combination in a single embodiment. Conversely, various features which are, for brevity, described in the context of a single embodiment, may also be provided separately or in any suitable sub combination.

Particular and preferred aspects of the present disclosure are set out in the accompanying independent claims. Combinations of features from the dependent and/or independent claims may be combined as appropriate and not merely as set out in the claims.

The scope of the present disclosure includes any novel feature or combination of features disclosed therein either explicitly or implicitly or any generalization thereof irrespective of whether or not it relates to the claimed aspect or mitigate against any or all of the problems addressed by the present disclosure. The applicant hereby gives notice that new claims may be formulated to such features during prosecution of this application or of any such further application derived therefrom. In particular, with reference to the appended claims, features from dependent claims may be combined with those of the independent claims and features from respective independent claims may be combined in any appropriate manner and not merely in specific combinations enumerated in the claims.

In the above, the present disclosure has been described using detailed embodiments thereof. However, the present disclosure is not limited to these embodiments. Instead, various modifications are possible without departing from the scope of the present disclosure which is defined by the appended claims and, at least in some jurisdictions, their equivalents.

The invention claimed is:

1. An X-ray system, comprising:
an X-ray source configured to be sequentially operable in a plurality of spectral modes in dependence of at least one synchronization signal, the plurality of modes including a first mode, in which the X-ray source is configured to emit first X-rays having a first spectrum, and a second mode, in which the X-ray source is configured to emit second X-rays having a second spectrum different from the first spectrum; and
an X-ray detector comprising a pixel controller, a readout unit, and an active pixel, wherein the active pixel comprises a first storage element and a second storage element,
wherein the pixel controller is configured to control the active pixel in dependence of the at least one synchronization signal to record a first signal associated with the first X-rays in the first storage element and record a second signal associated with the second X-rays in the second storage element,
wherein the readout unit is configured to read out the recorded first signal during or after the recording of the second signals by the active pixel, and
wherein the active pixel further comprises:
a photodetector, being a pinned photodiode, 'PPD', configured to convert incident photons into charge; and
a transfer element coupled between the PPD and the second storage element,
wherein the first storage element includes a capacitor, and wherein the second storage element is at least partially formed by the PPD.

2. The X-ray system according to claim 1, wherein the second storage element is configured to temporarily hold a first charge associated with the first X-rays, and wherein the pixel controller is configured to control the active pixel to record the first signal in the first storage element by transferring the first charge from the second storage element to the first storage element using the transfer element.

3. The X-ray system according to claim 1, wherein, after transferring the first charge from the PPD to the first storage element, the second storage element is configured to record the second signal by holding a second charge corresponding to the second signal associated with second X-rays.

4. The X-ray system according to claim 3, wherein, while the active pixel is recording the second signal in the second storage element, the readout unit is configured to read out the recorded first signal from the first storage element, and wherein, after the readout unit has read out the recorded first signal, the pixel controller is configured to control the active pixel to reset the first storage element.

5. The X-ray system according to claim 4, wherein, after the active pixel has recorded the second signal in the second storage element, the pixel controller is configured to control the transfer element to transfer the second charge from the second storage element to the first storage element,
wherein the readout unit is configured to read out the recorded second signal from the first storage element, and
wherein, after the readout unit has read out the recorded second signal, the pixel controller is configured to control the active pixel to reset the first storage element.

6. The X-ray system according to claim 3, wherein, after the active pixel has recorded the second signal in the second storage element:
the readout unit is configured to read out the recorded first signal from the first storage element;
the pixel controller is configured to subsequently control the active pixel to reset the first storage element and transfer the second charge from the second storage element to the first storage element using the transfer element; and
the readout unit is configured to subsequently read out the recorded second signal from the first storage element.

7. The X-ray system according to claim 6, wherein the readout unit is configured to use a same reference sample of the CDS or DDS for both the recorded first signal and the recorded second signal.

8. The X-ray system according to claim 1, wherein the readout unit is configured to read out the recorded first signal and/or the recorded second signal using correlated double sampling, 'CDS', or differential double sampling, 'DDS'.

9. The X-ray system according to claim 1, wherein the active pixel further comprises a source follower and a row selection switch coupled between the first storage element and a column line of the X-ray detector,
wherein the pixel controller is configured to activate the row selection switch to allow the readout unit to read out a signal from the first storage element.

10. The X-ray system according to claim 1, wherein the active pixel comprises a floating diffusion, 'FD', region to which the first storage element is coupled,
wherein the transfer element is coupled between the PPD and the FD region, or wherein the FD region forms part of the transfer element.

11. The X-ray system according to claim 10, wherein the PPD comprises a further FD region, wherein, preferably, the transfer element is realized as a metal-oxide-semiconductor, 'MOS', transistor, the FD region and the further FD region corresponding to a drain and a source of the MOS transistor, respectively.

12. The X-ray system according to claim 1, wherein the active pixel comprises a first reset switch for resetting the first storage element and/or a second reset switch (Mrset2; Mrst_pd) for resetting the second storage element.

13. The X-ray system according to claim 1, wherein the readout unit is configured to read out the recorded second signal during the recording of another first signal associated with the first X-rays of a subsequent frame among a plurality of frames to be recorded by the X-ray detector.

14. The X-ray system according to claim 1, wherein the X-ray detector is configured to alternatingly record a signal in one of the first and second storage element while reading out a previously recorded signal from another of the first and second storage element.

15. The X-ray system according to claim 1, wherein the X-ray detector or the X-ray system further comprises an image processing unit configured to generate spectral images corresponding to the first spectrum and the second spectrum based on data read out by the readout unit; and/or wherein the X-ray detector, preferably the pixel controller, is configured to generate at least one of the at least one synchronization signal, and/or wherein the X-ray source is configured to generate at least one of the at least one synchronization signal, and/or wherein the X-ray system further comprises a controller configured to generate at least one of the at least one synchronization signal for the X-ray source and/or the X-ray detector; and/or wherein the at least one synchronization signal includes one or more signals indicative of at least one of:

a start of operating in the first mode by the X-ray source;

a termination of operating in the first mode by the X-ray source;

a start of operating in the second mode by the X-ray source;

a termination of operating in the second mode by the X-ray source;

a completion of recording the first signals by the active pixel;

a completion of recording the second signals by the active pixel;

a completion of reading out the first signals by the readout unit; and a completion of reading out the second signals by the readout unit; and/or wherein the readout unit comprises an analog-to-digital converter, 'ADC', to convert the recorded first signal and the recorded second signal into digital signals as at least part of reading out the recorded first signal and recorded second signal; and/or wherein the X-ray detector comprises a plurality of said active pixels, preferably arranged in a matrix of rows and columns; and/or wherein the pixel controller is configured to control the readout unit in dependence of the at least one synchronization signal.

16. An X-ray detector configured as the X-ray detector as defined in claim 1.

17. An active pixel configured as the active pixel as defined in claim 1.

18. A pixel controller configured as the pixel controller as defined in claim 1.

19. A method for multi-spectrum X-ray imaging, comprising:

sequentially emitting, by an X-ray source, first X-rays having a first spectrum and second X-rays having a second spectrum different from the first spectrum;

recording, by an active pixel of an X-ray detector, a first signal associated with the first X-rays in a first storage element of the active pixel, and a second signal associated with the second X-rays in a second storage element of the active pixel; and reading out, by a readout unit of the X-ray detector, the recorded first signal during or after the recording of the second signal by the active pixel, wherein recording, by the active pixel of the X-ray detector, the first signal associated with the first X-rays in the first storage element of the active pixel comprises recording the first signal associated with the first X-rays in a capacitor, and wherein recording, by the active pixel of the X-ray detector, the second signal associated with the second X-rays in the second storage element of the active pixel comprises recording the second signal in a pinned photodiode, 'PPD', that forms at least a portion of the second storage element.

* * * * *